(12) United States Patent
Gass et al.

(10) Patent No.: US 7,308,843 B2
(45) Date of Patent: Dec. 18, 2007

(54) SPRING-BIASED BRAKE MECHANISM FOR POWER EQUIPMENT

(75) Inventors: Stephen F. Gass, Wilsonville, OR (US); David S. D'Ascenzo, Portland, OR (US)

(73) Assignee: SD3, LLC, Tualatin, OR (US)

( * ) Notice: Subject to any disclaimer, the term of this patent is extended or adjusted under 35 U.S.C. 154(b) by 823 days.

(21) Appl. No.: 09/929,227

(22) Filed: Aug. 13, 2001

(65) Prior Publication Data

US 2002/0020271 A1  Feb. 21, 2002

Related U.S. Application Data

(60) Provisional application No. 60/225,056, filed on Aug. 14, 2000, provisional application No. 60/225,057, filed on Aug. 14, 2000, provisional application No. 60/225,058, filed on Aug. 14, 2000, provisional application No. 60/225,059, filed on Aug. 14, 2000, provisional application No. 60/225,089, filed on Aug. 14, 2000, provisional application No. 60/225,094, filed on Aug. 14, 2000, provisional application No. 60/225,169, filed on Aug. 14, 2000, provisional application No. 60/225,170, filed on Aug. 14, 2000, provisional application No. 60/225,200, filed on Aug. 14, 2000, provisional application No. 60/225,201, filed on Aug. 14, 2000, provisional application No. 60/225,206, filed on Aug. 14, 2000, provisional application No. 60/225,210, filed on Aug. 14, 2000, provisional application No. 60/225,211, filed on Aug. 14, 2000, provisional application No. 60/225,212, filed on Aug. 14, 2000.

(51) Int. Cl.
*B26D 5/00* (2006.01)
*B27B 3/28* (2006.01)

(52) U.S. Cl. ............................. 83/58; 83/59; 83/62.1; 83/397.1; 83/471; 83/581

(58) Field of Classification Search ........ 83/DIG. 161, 83/58, 621, 526, 72, 76.8, 471.2, 357, 473, 83/477.1, 485, 483, 490, 491, 522.17, 544, 83/546, 564, 581, 590, 665, 471.3, 62.1, 83/DIG. 1, 397.1, 577.2, 471; 337/1, 5, 337/10, 17, 70, 140, 148, 170, 190, 737, 337/735; 403/2, 28; 411/7, 39, 390; 335/142; 74/2; 292/790, DIG. 66; 307/116, 142, 307/131; 152/179 R, 133, 148, 144, 142 R, 152/138, 132; 30/382, 381; 361/1, 124; 149/384, 391, 427, 154.5, 356; 340/530, 340/590, 180; 144/3.1
See application file for complete search history.

(56) References Cited

U.S. PATENT DOCUMENTS 0,146,886 A    1/1874    Doane et al.

(Continued)

FOREIGN PATENT DOCUMENTS

CH          297525        6/1954

(Continued)

OTHER PUBLICATIONS

Gordon Engineering Corp., Product Catalog, Oct. 1997, pp. cover, 1, 3 and back, Brookfield, Connecticut, US.

(Continued)

*Primary Examiner*—Boyer D. Ashley
*Assistant Examiner*—Ghassem Alie

(57) ABSTRACT

Woodworking machines are disclosed having cutting tools for cutting workpieces. The machines include a detection system adapted to detect one or more dangerous conditions between a person and the cutting tool. The machines also include at least one brake component adapted to engage and stop movement of the cutting tool, and an actuator adapted to move the brake component into contact with the cutting tool at a high acceleration when the detection system detects the dangerous condition between the person and the blade.

21 Claims, 12 Drawing Sheets

U.S. PATENT DOCUMENTS

| | | |
|---|---|---|
| 0,162,814 A | 5/1875 | Graves et al. |
| 0,261,090 A | 7/1882 | Grill |
| 0,264,412 A | 9/1882 | Kuhlmann |
| 0,299,480 A | 5/1884 | Kuhlmann et al. |
| 0,302,041 A | 7/1884 | Sill |
| 0,307,112 A | 10/1884 | Groff |
| 0,509,253 A | 11/1893 | Shields |
| 0,545,504 A | 9/1895 | Hoover |
| 0,869,513 A | 10/1907 | Pfeil |
| 941,726 A | 11/1909 | Pfalzgraf |
| 0,997,720 A | 7/1911 | Troupenat |
| 1,037,843 A | 9/1912 | Ackley |
| 1,050,649 A | 1/1913 | Harrold et al. |
| 1,054,558 A | 2/1913 | Jones |
| 1,074,198 A | 9/1913 | Phillips |
| 1,082,870 A | 12/1913 | Humason |
| 1,101,515 A | 6/1914 | Adam |
| 1,126,970 A | 2/1915 | Folmer |
| 1,132,129 A | 3/1915 | Stevens |
| 1,148,169 A | 7/1915 | Howe |
| 1,154,209 A | 9/1915 | Rushton |
| 1,205,246 A | 11/1916 | Mowry |
| 1,228,047 A | 5/1917 | Reinhold |
| 1,240,430 A | 9/1917 | Erickson |
| 1,244,187 A | 10/1917 | Frisbie |
| 1,255,886 A | 2/1918 | Jones |
| 1,258,961 A | 3/1918 | Tattersall |
| 1,311,508 A | 7/1919 | Harrold |
| 1,324,136 A | 12/1919 | Turner |
| 1,381,612 A | 6/1921 | Anderson |
| 1,397,606 A | 11/1921 | Smith |
| 1,427,005 A | 8/1922 | McMichael |
| 1,430,983 A | 10/1922 | Granberg |
| 1,464,924 A | 8/1923 | Drummond |
| 1,465,224 A | 8/1923 | Lantz |
| 1,496,212 A | 6/1924 | French |
| 1,511,797 A | 10/1924 | Berghold |
| 1,526,128 A | 2/1925 | Flohr |
| 1,527,587 A | 2/1925 | Hutchinson |
| 1,551,900 A | 9/1925 | Morrow |
| 1,553,996 A | 9/1925 | Federer |
| 1,582,483 A | 4/1926 | Runyan |
| 1,600,604 A | 9/1926 | Sorlien |
| 1,616,478 A | 2/1927 | Watson |
| 1,640,517 A | 8/1927 | Procknow |
| 1,662,372 A | 3/1928 | Ward |
| 1,701,948 A | 2/1929 | Crowe |
| 1,711,490 A | 5/1929 | Drummond |
| 1,712,828 A | 5/1929 | Klehm |
| 1,774,521 A | 9/1930 | Neighbour |
| 1,807,120 A | 5/1931 | Lewis |
| 1,811,066 A | 6/1931 | Tannewitz |
| 1,879,280 A | 9/1932 | James |
| 1,896,924 A | 2/1933 | Ulrich |
| 1,902,270 A | 3/1933 | Tate |
| 1,904,005 A | 4/1933 | Masset |
| 1,910,651 A | 5/1933 | Tautz |
| 1,938,548 A | 12/1933 | Tautz |
| 1,938,549 A | 12/1933 | Tautz |
| 1,963,688 A | 6/1934 | Tautz |
| 1,988,102 A | 1/1935 | Woodward |
| 1,993,219 A | 3/1935 | Merrigan |
| 2,007,887 A | 7/1935 | Tautz |
| 2,010,851 A | 8/1935 | Drummond |
| 2,020,222 A | 11/1935 | Tautz |
| 2,038,810 A | 4/1936 | Tautz |
| 2,075,282 A | 3/1937 | Hedgpeth |
| 2,095,330 A | 10/1937 | Hedgpeth |
| 2,106,288 A | 1/1938 | Tautz |
| 2,106,321 A | 1/1938 | Guertin |
| 2,121,069 A | 6/1938 | Collins |
| 2,131,492 A | 9/1938 | Ocenasek |
| 2,163,320 A | 6/1939 | Hammond |
| 2,168,282 A | 8/1939 | Tautz |
| 2,241,556 A | 5/1941 | MacMillin et al. |
| 2,261,696 A | 11/1941 | Ocenasek |
| 2,265,407 A | 12/1941 | Tautz |
| 2,286,589 A | 6/1942 | Tannewitz |
| 2,292,872 A | 8/1942 | Eastman |
| 2,299,262 A | 10/1942 | Uremovich |
| 2,312,118 A | 2/1943 | Neisewander |
| 2,313,686 A | 3/1943 | Uremovich |
| 2,328,244 A | 8/1943 | Woodward |
| 2,352,235 A | 6/1944 | Tautz |
| 2,377,265 A * | 5/1945 | Rady .................. 200/302.1 |
| 2,402,232 A | 6/1946 | Baker |
| 2,425,331 A | 8/1947 | Kramer |
| 2,434,174 A | 1/1948 | Morgan |
| 2,452,589 A | 11/1948 | McWhirter et al. |
| 2,466,325 A | 4/1949 | Ocenasek |
| 2,496,613 A | 2/1950 | Woodward |
| 2,509,813 A * | 5/1950 | Dineen .................. 192/101 |
| 2,517,649 A | 8/1950 | Frechtmann |
| 2,518,684 A | 8/1950 | Harris |
| 2,530,290 A | 11/1950 | Collins |
| 2,554,124 A | 5/1951 | Salmont |
| 2,562,396 A | 7/1951 | Schutz |
| 2,572,326 A | 10/1951 | Evans |
| 2,590,035 A | 3/1952 | Pollak |
| 2,593,596 A | 4/1952 | Olson |
| 2,601,878 A | 7/1952 | Anderson |
| 2,623,555 A | 12/1952 | Eschenburg |
| 2,625,966 A | 1/1953 | Copp |
| 2,626,639 A | 1/1953 | Hess |
| 2,661,777 A | 12/1953 | Hitchcock |
| 2,661,780 A | 12/1953 | Morgan |
| 2,675,707 A * | 4/1954 | Brown ........................ 74/2 |
| 2,678,071 A | 5/1954 | Odlum et al. |
| 2,690,084 A | 9/1954 | Van Dam |
| 2,695,638 A | 11/1954 | Gaskell |
| 2,704,560 A | 3/1955 | Woessner |
| 2,711,762 A | 6/1955 | Gaskell |
| 2,722,246 A | 11/1955 | Arnoldy |
| 2,731,049 A | 1/1956 | Akin |
| 2,736,348 A | 2/1956 | Nelson |
| 2,737,213 A | 3/1956 | Richards et al. |
| 2,758,615 A | 8/1956 | Mastriforte |
| 2,785,710 A | 3/1957 | Mowery, Jr. |
| 2,786,496 A | 3/1957 | Eschenburg |
| 2,810,408 A | 10/1957 | Boice et al. |
| 2,844,173 A | 7/1958 | Gaskell |
| 2,850,054 A | 9/1958 | Eschenburg |
| 2,852,047 A | 9/1958 | Odlum et al. |
| 2,873,773 A | 2/1959 | Gaskell |
| 2,883,486 A | 4/1959 | Mason |
| 2,894,546 A | 7/1959 | Eschenburg |
| 2,913,025 A | 11/1959 | Richards |
| 2,945,516 A | 7/1960 | Edgemond, Jr. et al. |
| 2,954,118 A | 9/1960 | Anderson |
| 2,957,166 A | 10/1960 | Gluck |
| 2,978,084 A | 4/1961 | Vilkaitis |
| 2,984,268 A | 5/1961 | Vuichard |
| 2,991,593 A | 7/1961 | Cohen |
| 3,005,477 A | 10/1961 | Sherwen |
| 3,011,529 A | 12/1961 | Copp |
| 3,011,610 A | 12/1961 | Stiebel et al. |
| 3,013,592 A | 12/1961 | Ambrosio et al. |
| 3,021,881 A | 2/1962 | Edgemond, Jr. et al. |
| 3,035,995 A | 5/1962 | Seeley et al. |
| 3,047,116 A | 7/1962 | Stiebel et al. |
| 3,085,602 A | 4/1963 | Gaskell |
| 3,105,530 A | 10/1963 | Peterson |
| 3,129,731 A | 4/1964 | Tyrrell |
| 3,163,732 A * | 12/1964 | Abbott et al. .............. 337/128 |

| | | | | | | |
|---|---|---|---|---|---|---|
| 3,184,001 A | 5/1965 | Reinsch et al. | | 4,106,378 A | 8/1978 | Kaiser |
| 3,186,256 A | 6/1965 | Reznick | | 4,117,752 A | 10/1978 | Yoneda |
| 3,207,273 A * | 9/1965 | Jurin ........................... 49/7 | | 4,145,940 A | 3/1979 | Woloveke et al. |
| 3,224,474 A | 12/1965 | Bloom | | 4,152,833 A | 5/1979 | Phillips |
| 3,232,326 A | 2/1966 | Speer et al. | | 4,161,649 A | 7/1979 | Klos et al. |
| 3,246,205 A | 4/1966 | Miller | | 4,175,452 A | 11/1979 | Idel |
| 3,249,134 A | 5/1966 | Vogl et al. | | 4,190,000 A | 2/1980 | Shaull et al. |
| 3,306,149 A | 2/1967 | John | | 4,195,722 A | 4/1980 | Anderson et al. |
| 3,313,185 A | 4/1967 | Drake et al. | | 4,199,930 A | 4/1980 | Lebet et al. |
| 3,315,715 A | 4/1967 | Mytinger | | 4,249,117 A | 2/1981 | Leukhardt et al. |
| 3,323,814 A * | 6/1967 | Phillips ..................... 403/11 | | 4,249,442 A | 2/1981 | Fittery |
| 3,337,008 A | 8/1967 | Trachte | | 4,262,278 A | 4/1981 | Howard et al. |
| 3,356,111 A | 12/1967 | Mitchell | | 4,267,914 A | 5/1981 | Saar |
| 3,386,322 A | 6/1968 | Stone et al. | | 4,270,427 A | 6/1981 | Colberg et al. |
| 3,439,183 A | 4/1969 | Hurst, Jr. | | 4,276,799 A | 7/1981 | Muehling |
| 3,454,286 A | 7/1969 | Anderson et al. | | 4,291,794 A | 9/1981 | Bauer |
| 3,538,964 A | 11/1970 | Warrick et al. | | 4,305,442 A | 12/1981 | Currie |
| 3,540,338 A | 11/1970 | McEwan et al. | | 4,321,841 A | 3/1982 | Felix |
| 3,554,067 A | 1/1971 | Scutella | | 4,372,202 A | 2/1983 | Cameron |
| 3,566,996 A | 3/1971 | Crossman | | 4,391,358 A | 7/1983 | Haeger |
| 3,580,376 A | 5/1971 | Loshbough | | 4,418,597 A | 12/1983 | Krusemark et al. |
| 3,581,784 A | 6/1971 | Warrick | | 4,466,233 A | 8/1984 | Thesman |
| 3,613,748 A | 10/1971 | De Pue | | 4,470,046 A | 9/1984 | Betsill |
| 3,670,788 A | 6/1972 | Pollak et al. | | 4,510,489 A | 4/1985 | Anderson, III et al. |
| 3,675,444 A * | 7/1972 | Whipple ..................... 464/160 | | 4,512,224 A | 4/1985 | Terauchi |
| 3,580,609 A | 8/1972 | Menge | | 4,518,043 A | 5/1985 | Anderson et al. |
| 3,680,609 A | 8/1972 | Menge | | 4,532,501 A | 7/1985 | Hoffman |
| 3,688,815 A | 9/1972 | Ridenour | | 4,532,844 A | 8/1985 | Chang et al. |
| 3,695,116 A | 10/1972 | Baur | | 4,557,168 A | 12/1985 | Tokiwa |
| 3,696,844 A | 10/1972 | Bernatschek | | 4,560,033 A | 12/1985 | DeWoody et al. |
| 3,745,546 A | 7/1973 | Struger et al. | | 4,566,512 A | 1/1986 | Wilson |
| 3,749,933 A | 7/1973 | Davidson | | 4,573,556 A | 3/1986 | Andreasson |
| 3,754,493 A | 8/1973 | Niehaus et al. | | 4,576,073 A | 3/1986 | Stinson |
| 3,772,590 A | 11/1973 | Mikulecky et al. | | 4,589,047 A | 5/1986 | Gaus et al. |
| 3,785,230 A | 1/1974 | Lokey | | 4,589,860 A | 5/1986 | Brandenstein et al. |
| 3,805,639 A | 4/1974 | Peter | | 4,599,597 A * | 7/1986 | Rotbart ..................... 337/206 |
| 3,805,658 A | 4/1974 | Scott et al. | | 4,599,927 A | 7/1986 | Eccardt et al. |
| 3,808,932 A | 5/1974 | Russell | | 4,606,251 A | 8/1986 | Boileau |
| 3,829,850 A | 8/1974 | Guetersloh | | 4,615,247 A | 10/1986 | Berkeley |
| 3,858,095 A | 12/1974 | Friemann et al. | | 4,621,300 A | 11/1986 | Summerer |
| 3,861,016 A | 1/1975 | Johnson et al. | | 4,625,604 A | 12/1986 | Handler et al. |
| 3,863,208 A | 1/1975 | Balban | | 4,637,188 A | 1/1987 | Crothers |
| 3,880,032 A | 4/1975 | Green | | 4,637,289 A | 1/1987 | Ramsden |
| 3,882,744 A | 5/1975 | McCarroll | | 4,644,832 A | 2/1987 | Smith |
| 3,886,413 A | 5/1975 | Dow et al. | | 4,653,189 A | 3/1987 | Andreasson |
| 3,889,567 A | 6/1975 | Sato et al. | | 4,657,428 A | 4/1987 | Wiley |
| 3,922,785 A | 12/1975 | Fushiya | | 4,672,500 A | 6/1987 | Tholome et al. |
| 3,924,688 A | 12/1975 | Cooper et al. | | 4,679,719 A | 7/1987 | Kramer |
| 3,931,727 A | 1/1976 | Luenser | | 4,722,021 A | 1/1988 | Hornung et al. |
| 3,935,777 A | 2/1976 | Bassett | | 4,751,603 A | 6/1988 | Kwan |
| 3,945,286 A | 3/1976 | Smith | | 4,756,220 A | 7/1988 | Olsen et al. |
| 3,946,631 A | 3/1976 | Malm | | 4,757,881 A | 7/1988 | Jonsson et al. |
| 3,947,734 A | 3/1976 | Fyler | | 4,792,965 A | 12/1988 | Morgan |
| 3,949,636 A | 4/1976 | Ball et al. | | 4,805,504 A | 2/1989 | Fushiya et al. |
| 3,953,770 A | 4/1976 | Hayashi | | 4,840,135 A | 6/1989 | Yamauchi |
| 3,967,161 A | 6/1976 | Lichtblau | | 4,864,455 A | 9/1989 | Shimomura et al. |
| 3,974,565 A | 8/1976 | Ellis | | 4,875,398 A | 10/1989 | Taylor et al. |
| 3,975,600 A | 8/1976 | Marston | | 4,896,607 A | 1/1990 | Hall et al. |
| 3,994,192 A | 11/1976 | Faig | | 4,906,962 A | 3/1990 | Duimstra |
| 4,007,679 A | 2/1977 | Edwards | | 4,934,233 A | 6/1990 | Brundage et al. |
| 4,016,490 A | 4/1977 | Weckenmann et al. | | 4,936,876 A | 6/1990 | Reyes |
| 4,026,174 A | 5/1977 | Fierro | | 4,937,554 A | 6/1990 | Herman |
| 4,026,177 A | 5/1977 | Lokey | | 4,965,909 A | 10/1990 | McCullough et al. |
| 4,029,159 A | 6/1977 | Nymann | | 4,975,798 A | 12/1990 | Edwards et al. |
| 4,047,156 A | 9/1977 | Atkins | | 5,020,406 A | 6/1991 | Sasaki et al. |
| 4,048,886 A | 9/1977 | Zettler | | 5,025,175 A | 6/1991 | Dubois, III |
| 4,060,160 A | 11/1977 | Lieber | | 5,046,426 A | 9/1991 | Julien et al. |
| 4,070,940 A | 1/1978 | McDaniel et al. | | 5,052,255 A | 10/1991 | Gaines |
| 4,075,961 A | 2/1978 | Harris | | 5,074,047 A | 12/1991 | King |
| 4,077,161 A | 3/1978 | Wyle et al. | | 5,081,406 A | 1/1992 | Hughes et al. |
| 4,085,303 A | 4/1978 | McIntyre et al. | | 5,082,316 A * | 1/1992 | Wardlaw ..................... 292/201 |
| 4,090,345 A | 5/1978 | Harkness | | 5,083,973 A | 1/1992 | Townsend |
| 4,091,698 A | 5/1978 | Obear et al. | | 5,086,890 A | 2/1992 | Turczyn et al. |

| | | | | | |
|---|---|---|---|---|---|
| 5,094,000 A | 3/1992 | Becht et al. | 6,037,729 A | 3/2000 | Woods et al. |
| 5,119,555 A | 6/1992 | Johnson | 6,052,884 A | 4/2000 | Steckler et al. |
| 5,122,091 A | 6/1992 | Townsend | 6,095,092 A | 8/2000 | Chou |
| 5,174,349 A | 12/1992 | Svetlik et al. | 6,119,984 A | 9/2000 | Devine |
| 5,184,534 A | 2/1993 | Lee | 6,133,818 A | 10/2000 | Hsieh et al. |
| 5,198,702 A | 3/1993 | McCullough et al. | 6,141,192 A | 10/2000 | Garzon |
| 5,199,343 A | 4/1993 | OBanion | 6,148,504 A | 11/2000 | Schmidt et al. |
| 5,201,684 A | 4/1993 | DeBois, III | 6,150,826 A | 11/2000 | Hokodate et al. |
| 5,207,253 A | 5/1993 | Hoshino et al. | 6,170,370 B1 | 1/2001 | Sommerville |
| 5,212,621 A | 5/1993 | Panter | 6,244,149 B1 | 6/2001 | Ceroll et al. |
| 5,218,189 A | 6/1993 | Hutchison | 6,257,061 B1 | 7/2001 | Nonoyama et al. |
| 5,231,359 A | 7/1993 | Masuda et al. | 6,352,137 B1 | 3/2002 | Stegall et al. |
| 5,231,906 A | 8/1993 | Kogej | 6,366,099 B1 | 4/2002 | Reddi |
| 5,239,978 A | 8/1993 | Plangetis | 6,376,939 B1 | 4/2002 | Suzuki et al. |
| 5,245,879 A * | 9/1993 | McKeon .......................... 74/2 | 6,404,098 B1 | 6/2002 | Kayama et al. |
| 5,257,570 A | 11/1993 | Shiotani et al. | 6,405,624 B2 | 6/2002 | Sutton |
| 5,265,510 A | 11/1993 | Hoyer-Ellefsen | 6,418,829 B1 | 7/2002 | Pilchowski |
| 5,272,946 A | 12/1993 | McCullough et al. | 6,420,814 B1 | 7/2002 | Bobbio |
| 5,276,431 A | 1/1994 | Piccoli et al. | 6,427,570 B1 | 8/2002 | Miller et al. |
| 5,285,708 A | 2/1994 | Bosten et al. | 6,430,007 B1 | 8/2002 | Jabbari |
| 5,320,382 A | 6/1994 | Goldstein et al. | 6,431,425 B1 | 8/2002 | Moorman et al. |
| 5,321,230 A | 6/1994 | Shanklin et al. | 6,450,077 B1 | 9/2002 | Ceroll et al. |
| 5,331,875 A | 7/1994 | Mayfield | 6,453,786 B1 | 9/2002 | Ceroll et al. |
| 5,353,670 A | 10/1994 | Metzger, Jr. | 6,460,442 B2 | 10/2002 | Talesky et al. |
| 5,377,554 A | 1/1995 | Reulein et al. | 6,471,106 B1 | 10/2002 | Reining |
| 5,377,571 A | 1/1995 | Josephs | 6,479,958 B1 | 11/2002 | Thompson et al. |
| 5,392,678 A | 2/1995 | Sasaki et al. | D466,913 S | 12/2002 | Ceroll et al. |
| 5,401,928 A | 3/1995 | Kelley | 6,492,802 B1 | 12/2002 | Bielski |
| 5,411,221 A | 5/1995 | Collins et al. | D469,354 S | 1/2003 | Curtsinger |
| 5,451,750 A | 9/1995 | An | 6,502,493 B1 | 1/2003 | Eccardt et al. |
| 5,453,903 A | 9/1995 | Chow | 6,536,536 B1 | 3/2003 | Gass et al. |
| 5,471,888 A | 12/1995 | McCormick | 6,543,324 B2 | 4/2003 | Dils |
| 5,480,009 A | 1/1996 | Wieland et al. | 6,546,835 B2 | 4/2003 | Wang |
| 5,503,059 A | 4/1996 | Pacholok | 6,575,067 B2 | 6/2003 | Parks et al. |
| 5,510,685 A | 4/1996 | Grasselli | 6,578,460 B2 | 6/2003 | Sartori |
| 5,513,548 A | 5/1996 | Garuglieri | 6,578,856 B2 | 6/2003 | Kahle |
| 5,534,836 A | 7/1996 | Schenkel et al. | 6,595,096 B2 | 7/2003 | Ceroll et al. |
| 5,572,916 A | 11/1996 | Takano | D478,917 S | 8/2003 | Ceroll et al. |
| 5,587,618 A | 12/1996 | Hathaway | 6,601,493 B1 | 8/2003 | Crofutt |
| 5,592,353 A | 1/1997 | Shinohara et al. | 6,607,015 B1 | 8/2003 | Chen |
| 5,606,889 A | 3/1997 | Bielinski et al. | D479,538 S | 9/2003 | Welsh et al. |
| 5,623,860 A | 4/1997 | Schoene et al. | 6,617,720 B1 | 9/2003 | Egan, III et al. |
| 5,648,644 A | 7/1997 | Nagel | 6,619,348 B2 | 9/2003 | Wang |
| 5,659,454 A | 8/1997 | Vermesse | 6,640,683 B2 | 11/2003 | Lee |
| 5,667,152 A | 9/1997 | Mooring | 6,644,157 B2 | 11/2003 | Huang |
| 5,671,633 A | 9/1997 | Wagner | 6,647,847 B2 | 11/2003 | Hewitt et al. |
| 5,695,306 A | 12/1997 | Nygren, Jr. | 6,659,233 B2 | 12/2003 | DeVlieg |
| 5,700,165 A | 12/1997 | Harris et al. | 6,736,042 B2 | 5/2004 | Behne et al. |
| 5,724,875 A | 3/1998 | Meredith et al. | 6,742,430 B2 | 6/2004 | Chen |
| 5,730,165 A | 3/1998 | Philipp | 6,826,988 B2 | 12/2004 | Gass et al. |
| 5,741,048 A | 4/1998 | Eccleston | 6,857,345 B2 | 2/2005 | Gass et al. |
| 5,755,148 A | 5/1998 | Stumpf et al. | 6,874,397 B2 | 4/2005 | Chang |
| 5,771,742 A | 6/1998 | Bokaie et al. | 6,874,399 B2 | 4/2005 | Lee |
| 5,782,001 A | 7/1998 | Gray | 2001/0032534 A1 | 10/2001 | Cerroll et al. |
| 5,787,779 A | 8/1998 | Garuglieri | 2002/0017180 A1* | 2/2002 | Gass et al. ..................... 83/58 |
| 5,791,057 A | 8/1998 | Nakamura et al. | 2002/0017184 A1* | 2/2002 | Gass et al. ................. 83/477.2 |
| 5,791,223 A | 8/1998 | Lanzer | 2002/0020261 A1* | 2/2002 | Gass et al. ..................... 83/58 |
| 5,791,224 A | 8/1998 | Suzuki et al. | 2002/0020262 A1* | 2/2002 | Gass et al. ..................... 83/58 |
| 5,791,441 A | 8/1998 | Matos et al. | 2002/0020263 A1* | 2/2002 | Gass et al. ..................... 83/58 |
| 5,819,619 A | 10/1998 | Miller et al. | 2002/0059854 A1* | 5/2002 | Gass et al. ..................... 83/62 |
| 5,852,951 A | 12/1998 | Santi | 2002/0096030 A1 | 7/2002 | Wang |
| 5,861,809 A | 1/1999 | Eckstein et al. | 2002/0109036 A1 | 8/2002 | Denen et al. |
| 5,875,698 A | 3/1999 | Ceroll et al. | 2002/0170400 A1* | 11/2002 | Gass .......................... 83/62.1 |
| 5,921,367 A | 7/1999 | Kashioka et al. | 2003/0037651 A1* | 2/2003 | Gass et al. .................. 83/62.1 |
| 5,930,096 A | 7/1999 | Kim | 2003/0037655 A1 | 2/2003 | Chin-Chin |
| 5,937,720 A | 8/1999 | Itzov | 2003/0074873 A1 | 4/2003 | Freiberg et al. |
| 5,942,975 A | 8/1999 | Sorensen | 2003/0089212 A1 | 5/2003 | Parks et al. |
| 5,943,932 A | 8/1999 | Sberveglieri | 2003/0101857 A1 | 6/2003 | Chuang |
| 5,950,514 A | 9/1999 | Benedict et al. | 2003/0109798 A1 | 6/2003 | Kermani |
| 5,963,173 A | 10/1999 | Lian et al. | 2004/0011177 A1 | 1/2004 | Huang |
| 5,974,927 A | 11/1999 | Tsune | 2004/0060404 A1 | 4/2004 | Metzger, Jr. |
| 5,989,116 A | 11/1999 | Johnson et al. | 2004/0104085 A1 | 6/2004 | Lang et al. |
| 6,018,284 A | 1/2000 | Rival et al. | 2004/0159198 A1 | 8/2004 | Peot et al. |

| | | | | | | |
|---|---|---|---|---|---|---|
| 2004/0194594 | A1 | 10/2004 | Dils et al. | DE | 19609771 | 6/1998 |
| 2004/0200329 | A1 | 10/2004 | Sako | EP | 146460 | 11/1988 |
| 2004/0226424 | A1* | 11/2004 | O'Banion et al. ............ 83/397 | EP | 0362937 A2 | 4/1990 |
| 2004/0226800 | A1 | 11/2004 | Pierga et al. | ES | 2152184 | 1/2001 |
| 2005/0057206 | A1 | 3/2005 | Uneyama | FR | 2556643 | 6/1985 |
| 2005/0092149 | A1 | 5/2005 | Hartmann | FR | 2570017 | 3/1986 |
| 2005/0139051 | A1 | 6/2005 | Gass et al. | GB | 598204 | 2/1948 |
| 2005/0139056 | A1 | 6/2005 | Gass et al. | GB | 1132708 | 11/1968 |
| 2005/0139057 | A1 | 6/2005 | Gass et al. | GB | 2096844 | 10/1982 |
| 2005/0139058 | A1 | 6/2005 | Gass et al. | GB | 2142571 | 1/1985 |
| 2005/0139059 | A1 | 6/2005 | Gass et al. | | | |

FOREIGN PATENT DOCUMENTS

| | | |
|---|---|---|
| DE | 76186 | 8/1921 |
| DE | 2800403 | 7/1979 |
| DE | 3427733 | 1/1986 |
| DE | 4235161 A1 | 5/1993 |
| DE | 4326313 | 2/1995 |

OTHER PUBLICATIONS

Analog Devices, Inc., 3-Axis Capacitive Sensor—Preliminary Technical Data AD7103, pp. 1-40, © 1998.

* cited by examiner

SPRING-BIASED BRAKE MECHANISM FOR POWER EQUIPMENT

CROSS-REFERENCE TO RELATED APPLICATIONS

This application claims the benefit of and priority from the following U.S. Provisional Patent Applications: Ser. No. 60/225,056, filed Aug. 14, 2000, Ser. No. 60/225,057, filed Aug. 14, 2000, Ser. No. 60/225,058, filed Aug. 14, 2000, Ser. No. 60/225,059, filed Aug. 14, 2000, Ser. No. 60/225,089, filed Aug. 14, 2000, Ser. No. 60/225,094, filed Aug. 14, 2000, Ser. No. 60/225,169, filed Aug. 14, 2000, Ser. No. 60/225,170, filed Aug. 14, 2000, Ser. No. 60/225,200, filed Aug. 14, 2000, Ser. No. 60/225,201, filed Aug. 14, 2000, Ser. No. 60/225,206, filed Aug. 14, 2000, Ser. No. 60/225,210, filed Aug. 14, 2000, Ser. No. 60/225,211, filed Aug. 14, 2000, and Ser. No. 60/225,212, filed Aug. 14, 2000.

FIELD

The present invention relates to safety systems for power equipment, and more particularly to a spring-biased brake mechanism for use on power equipment, such as woodworking machines.

BACKGROUND

Safety systems are often employed with power equipment such as table saws, miter saws, band saws, jointers, shapers, circular saws and other woodworking machinery, to minimize the risk of injury when using the equipment. Probably the most common safety feature is a guard that physically blocks an operator from making contact with dangerous components of machinery, such as belts, shafts or blades. In many cases, guards effectively reduce the risk of injury, however, there are many instances where the nature of the operations to be performed precludes using a guard that completely blocks access to hazardous machine parts.

The present invention discloses a safety system, and power equipment incorporating a safety system, that includes a spring-biased brake mechanism adapted to engage the blade or other cutting tool to protect the user against serious injury if a dangerous, or triggering, condition, such as contact between the user's body and the blade or other cutting tool, occurs. The brake mechanism includes a pawl that is biased to engage and quickly stop the blade or other cutting tool.

DETAILED DESCRIPTION

Figure 1:
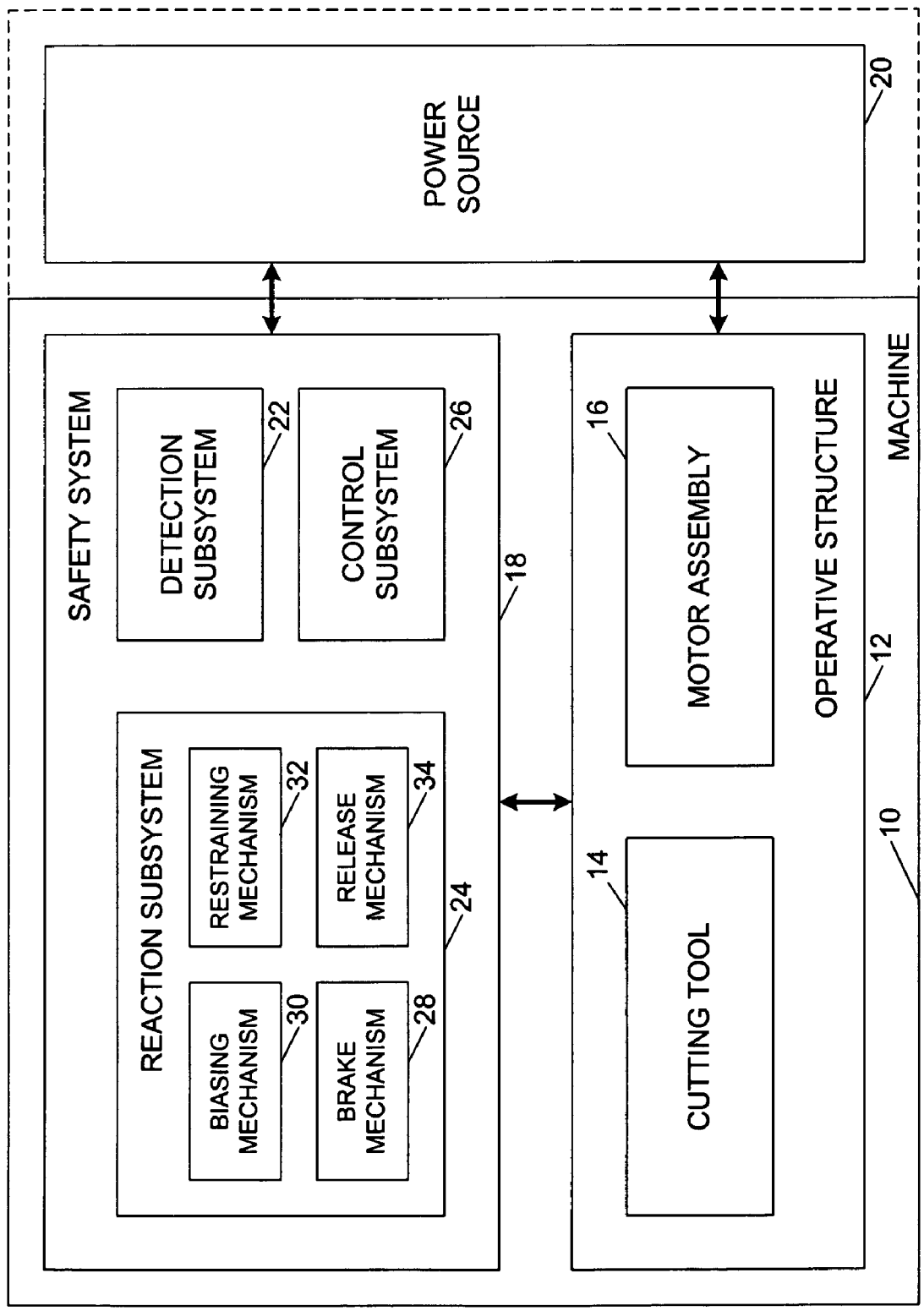
FIG. 1 is a schematic block diagram of a machine with a fast-acting safety system according to the present invention.

A machine is shown schematically in FIG. 1 and indicated generally at 10. Machine 10 may be any of a variety of different machines adapted for cutting workpieces, such as wood, including a table saw, miter saw (chop saw), radial arm saw, circular saw, band saw, jointer, planer, etc. Machine 10 includes an operative structure 12 having a cutting tool 14 and a motor assembly 16 adapted to drive the cutting tool. Machine 10 also includes a safety system 18 configured to minimize the potential of a serious injury to a person using machine 10. Safety system 18 is adapted to detect the occurrence of one or more dangerous, or triggering, conditions during use of machine 10. If such a dangerous condition is detected, safety system 18 is adapted to engage operative structure 12 to limit any injury to the user caused by the dangerous condition.

Machine 10 also includes a suitable power source 20 to provide power to operative structure 12 and safety system 18. Power source 20 may be an external power source such as line current, or an internal power source such as a battery. Alternatively, power source 20 may include a combination of both external and internal power sources. Furthermore, power source 20 may include two or more separate power sources, each adapted to power different portions of machine 10.

It will be appreciated that operative structure 12 may take any one of many different forms, depending on the type of machine 10. For example, operative structure 12 may include a stationary housing configured to support motor assembly 16 in driving engagement with cutting tool 14. Alternatively, operative structure 12 may include a movable structure configured to carry cutting tool 14 between multiple operating positions. As a further alternative, operative structure 12 may include one or more transport mechanisms adapted to convey a workpiece toward and/or away from cutting tool 14.

Motor assembly 16 includes one or more motors adapted to drive cutting tool 14. The motors may be either directly or indirectly coupled to the cutting tool, and may also be adapted to drive workpiece transport mechanisms. Cutting tool 14 typically includes one or more blades or other suitable cutting implements that are adapted to cut or remove portions from the workpieces. The particular form of cutting tool 14 will vary depending upon the various embodiments of machine 10. For example, in table saws, miter saws, circular saws and radial arm saws, cutting tool 14 will typically include one or more circular rotating blades having a plurality of teeth disposed along the perimetrical edge of the blade. For a jointer or planer, the cutting tool typically includes a plurality of radially spaced-apart blades. For a band saw, the cutting tool includes an elongate, circuitous tooth-edged band.

Safety system 18 includes a detection subsystem 22, a reaction subsystem 24 and a control subsystem 26. Control subsystem 26 may be adapted to receive inputs from a variety of sources including detection subsystem 22, reaction subsystem 24, operative structure 12 and motor assembly 16. The control subsystem may also include one or more sensors adapted to monitor selected parameters of machine 10. In addition, control subsystem 26 typically includes one or more instruments operable by a user to control the machine. The control subsystem is configured to control machine 10 in response to the inputs it receives.

Detection subsystem 22 is configured to detect one or more dangerous, or triggering, conditions during use of machine 10. For example, the detection subsystem may be configured to detect that a portion of the user's body is dangerously close to, or in contact with, a portion of cutting tool 14. As another example, the detection subsystem may be configured to detect the rapid movement of a workpiece due to kickback by the cutting tool, as is described in U.S. Provisional Patent Application Ser. No. 60/182,866, filed Feb. 16, 2000, the disclosure of which is herein incorporated by reference. In some embodiments, detection subsystem 22 may inform control subsystem 26 of the dangerous condition, which then activates reaction subsystem 24. In other embodiments, the detection subsystem may be adapted to activate the reaction subsystem directly.

Once activated in response to a dangerous condition, reaction subsystem 24 is configured to engage operative structure 12 quickly to prevent serious injury to the user. It will be appreciated that the particular action to be taken by reaction subsystem 24 will vary depending on the type of machine 10 and/or the dangerous condition that is detected. For example, reaction subsystem 24 may be configured to do one or more of the following: stop the movement of cutting tool 14, disconnect motor assembly 16 from power source 20, place a barrier between the cutting tool and the user, or retract the cutting tool from its operating position, etc. The reaction subsystem may be configured to take a combination of steps to protect the user from serious injury. Placement of a barrier between the cutting tool and teeth is described in more detail in U.S. Provisional Patent Application Ser. No. 60/225,206, filed Aug. 14, 2000, entitled "Cutting Tool Safety System," and U.S. patent application Ser. No. 09/929,226, filed Aug. 13, 2001, entitled "Cutting Tool Safety System," the disclosures of which are herein incorporated by reference. Retraction of the cutting tool from its operating position is described in more detail in U.S. Provisional Patent Application Ser. No. 60/225,089, filed Aug. 14, 2000, entitled "Retraction System For Use In Power Equipment," and U.S. patent application Ser. No. 09/929,242, filed Aug. 13, 2001, entitled "Retraction System For Use In Power Equipment," the disclosures of which are herein incorporated by reference.

The configuration of reaction subsystem 24 typically will vary depending on which action(s) are taken. In the exemplary embodiment depicted in FIG. 1, reaction subsystem 24 is configured to stop the movement of cutting tool 14 and includes a brake mechanism 28, a biasing mechanism 30, a restraining mechanism 32, and a release mechanism 34. Brake mechanism 28 is adapted to engage operative structure 12 under the urging of biasing mechanism 30. During normal operation of machine 10, restraining mechanism 32 holds the brake mechanism out of engagement with the operative structure. However, upon receipt of an activation signal by reaction subsystem 24, the brake mechanism is released from the restraining mechanism by release mechanism 34, whereupon, the brake mechanism quickly engages at least a portion of the operative structure to bring the cutting tool to a stop.

Figure 2:
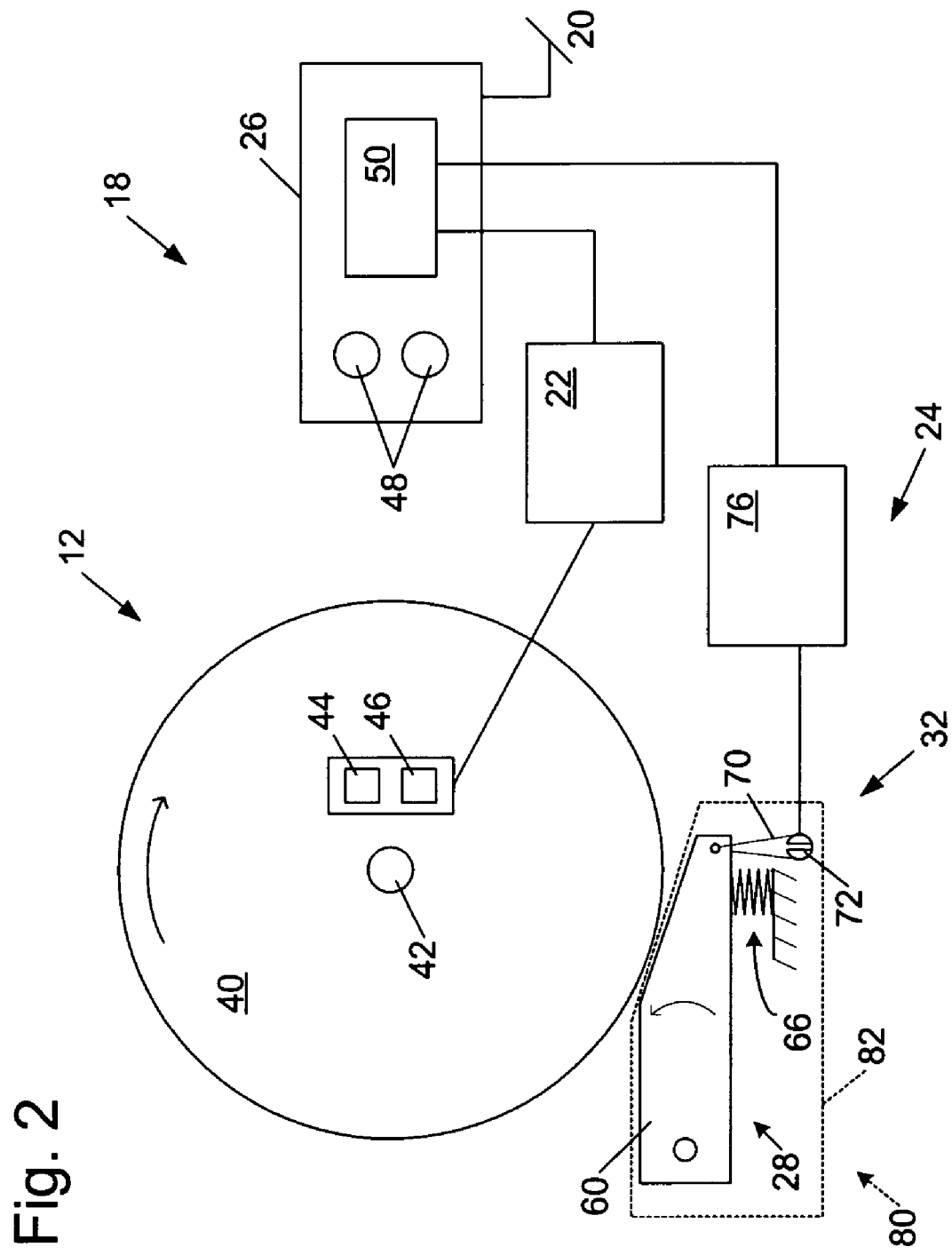
FIG. 2 is a schematic diagram of an exemplary safety system in the context of a machine having a circular blade.

It will be appreciated by those of skill in the art that the exemplary embodiment depicted in FIG. 1 and described above may be implemented in a variety of ways depending on the type and configuration of operative structure 12. Turning attention to FIG. 2, one example of the many possible implementations of safety system 18 is shown. System 18 is configured to engage an operative structure having a cutting tool in the form of a circular blade 40 mounted on a rotating shaft or arbor 42. Blade 40 includes a plurality of cutting teeth (not shown) disposed around the outer edge of the blade. As described in more detail below, braking mechanism 28 is adapted to engage the teeth of blade 40 and stop the rotation of the blade. U.S. Provisional Patent Application Ser. No. 60/225,210, filed Aug. 14, 2000, entitled, "Translation Stop For Use In Power Equipment," and U.S. patent application Ser. No. 09/929,425, filed Aug. 13, 2001, entitled "Translation Stop For Use In Power Equipment," the disclosures of which are herein incorporated by reference, describe other systems for stopping the movement of the cutting tool. U.S. Provisional Patent Application Ser. No. 60/225,058, filed Aug. 14, 2000, entitled "Table Saw With Improved Safety System," U.S. patent application Ser. No. 09/929,235, filed Aug. 13, 2001, entitled "Table Saw With Improved Safety System," U.S. Provisional Patent Application Ser. No. 60/225,057, filed Aug. 14, 2000, entitled "Miter Saw With Improved Safety System," and U.S. patent application Ser. No. 09/929,238, filed Aug. 13, 2001, entitled "Miter Saw With Improved Safety System," the disclosures of which are herein incorporated by reference, describe safety system 18 in the context of particular types of machines 10.

In the exemplary implementation, detection subsystem 22 is adapted to detect the dangerous condition of the user coming into contact with blade 40. The detection subsystem includes a sensor assembly, such as contact detection plates 44 and 46, capacitively coupled to blade 40 to detect any contact between the user's body and the blade. Typically, the blade, or some larger portion of cutting tool 14 is electrically isolated from the remainder of machine 10. Alternatively, detection subsystem 22 may include a different sensor assembly configured to detect contact in other ways, such as optically, resistively, etc. In any event, the detection subsystem is adapted to transmit a signal to control subsystem 26 when contact between the user and the blade is detected. Various exemplary embodiments and implementations of detection subsystem 22 are described in more detail in U.S. Provisional Patent Application Ser. No. 60/225,200, filed Aug. 14, 2000, entitled "Contact Detection System For Power Equipment," U.S. patent application Ser. No. 09/929,426, filed Aug. 13, 2001, entitled "Detection System For Power Equipment," U.S. Provisional Patent Application Ser. No. 60/225,211, filed Aug. 14, 2000, entitled "Apparatus And Method For Detecting Dangerous Conditions In Power Equipment," and U.S. patent application Ser. No. 09/929,221, filed Aug. 13, 2001, entitled "Apparatus And Method For Detection Dangerous Conditions In Power Equipment," the disclosures of which are herein incorporated by reference.

Control subsystem 26 includes one or more instruments 48 that are operable by a user to control the motion of blade 40. Instruments 48 may include start/stop switches, speed controls, direction controls, etc. Control subsystem 26 also includes a logic controller 50 connected to receive the user's inputs via instruments 48. Logic controller 50 is also connected to receive a contact detection signal from detection subsystem 22. Further, the logic controller may be configured to receive inputs from other sources (not shown) such as blade motion sensors, workpiece sensors, etc. In any event, the logic controller is configured to control operative structure 12 in response to the user's inputs through instruments 48. However, upon receipt of a contact detection signal from detection subsystem 22, the logic controller overrides the control inputs from the user and activates reaction subsystem 24 to stop the motion of the blade. Various exemplary embodiments and implementations of control subsystem 26 are described in more detail in U.S. Provisional Patent Application Ser. No. 60/225,059, filed Aug. 14, 2000, entitled "Logic Control For Fast-Acting Safety System," U.S. patent application Ser. No. 09/929,237, filed Aug. 13, 2001, entitled "Logic Control For Fast-Acting Safety System," U.S. Provisional Patent Application Ser. No. 60/225,094, filed Aug. 14, 2000, entitled "Motion Detecting System For Use In Safety System For Power Equipment," and U.S. patent application Ser. No. 09/929,234, filed Aug. 13, 2001, entitled "Motion Detecting System For Use In A Safety System For Power Equipment," the disclosures of which are herein incorporated by reference.

In the exemplary implementation, brake mechanism 28 includes a pawl 60 mounted adjacent the edge of blade 40 and selectively moveable to engage and grip the teeth of the blade. Pawl 60 may be constructed of any suitable material adapted to engage and stop the blade. As one example, the pawl may be constructed of a relatively high strength thermoplastic material such as polycarbonate or Acrylonitrile Butadiene Styrene (ABS), etc., or a metal such as aluminum, etc. It will be appreciated that the construction of pawl 60 will vary depending on the configuration of blade 40. In any event, the pawl is urged into the blade by a biasing mechanism in the form of a spring 66. In the illustrative embodiment shown in FIG. 2, pawl 60 is pivoted into the teeth of blade 40. It should be understood that sliding or rotary movement of pawl 60 may also be used. The spring is adapted to urge pawl 60 into the teeth of the blade with sufficient force to grip the blade and quickly bring it to a stop.

The pawl is held away from the edge of the blade by a restraining mechanism in the form of a fusible member 70. The fusible member is constructed of a suitable material adapted to restrain the pawl against the bias of spring 66, and also adapted to melt under a determined electrical current density. Examples of suitable materials for fusible member 70 include NiChrome wire, stainless steel wire, etc. The fusible member is connected between the pawl and a contact mount 72. Preferably, fusible member 70 holds the pawl relatively close to the edge of the blade to reduce the distance the pawl must travel to engage the blade. Positioning the pawl relatively close to the edge of the blade reduces the time required for the pawl to engage and stop the blade. Typically, the pawl is held approximately ¹⁄₃₂-inch to ¼-inch from the edge of the blade by fusible member 70, however other pawl-to-blade spacings may also be used within the scope of the invention.

Pawl 60 is released from its unactuated, or cocked, position to engage blade 40 by a release mechanism in the form of a firing subsystem 76. The firing subsystem is coupled to contact mount 72, and is configured to melt fusible member 70 by passing a surge of electrical current through the fusible member. Firing subsystem 76 is coupled to logic controller 50 and activated by a signal from the logic controller. When the logic controller receives a contact detection signal from detection subsystem 22, the logic controller sends an activation signal to firing subsystem 76, which melts fusible member 70, thereby releasing the pawl to stop the blade. Various exemplary embodiments and implementations of reaction subsystem 24 are described in more detail in U.S. Provisional Patent Application Ser. No. 60/225,056, filed Aug. 14, 2000, entitled "Firing Subsystem For Use In A Fast Acting Safety System," U.S. patent application Ser. No. 09/929,240, filed Aug. 13, 2001, entitled "Firing Subsystem For Use In A Fast Acting Safety System," U.S. Provisional Patent Application Ser. No. 60/225,169, filed Aug. 14, 2000, entitled "Brake Mechanism For Power Equipment," and U.S. patent application Ser. No. 09/929,241, filed Aug. 13, 2001, entitled "Brake Mechanism For Power Equipment," the disclosures of which are herein incorporated by reference.

It will be appreciated that activation of the brake mechanism will require the replacement of one or more portions of safety system 18. For example, pawl 60 and fusible member 70 typically must be replaced before the safety system is ready to be used again. Thus, it may be desirable to construct one or more portions of safety system 18 in a cartridge that can be easily replaced. For example, in the exemplary implementation depicted in FIG. 2, safety system 18 includes a replaceable cartridge 80 having a housing 82. Pawl 60, spring 66, fusible member 70 and contact mount 72 are all mounted within housing 82. Alternatively, other portions of safety system 18 may be mounted within the housing. In any event, after the reaction system has been activated, the safety system can be reset, such as by replacing cartridge 80. The portions of safety system 18 not mounted within the cartridge may be replaced separately or reused as appropriate. Various exemplary embodiments and implementations of a safety system using a replaceable cartridge are described in more detail in U.S. Provisional Patent Application Ser. No. 60/225,201, filed Aug. 14, 2000, entitled "Replaceable Brake Mechanism For Power Equipment," U.S. patent application Ser. No. 09/929,236, filed Aug. 13, 2001, entitled "Replaceable Brake Mechanism For Power Equipment," U.S. Provisional Patent Application Ser. No. 60/225,212, filed Aug. 14, 2000, entitled "Brake Positioning System," and U.S. patent application Ser. No. 09/929,244, filed Aug. 13, 2001, entitled Brake Positioning System," the disclosures of which are herein incorporated by reference. However, it should be noted that a cartridge is not required.

While one particular implementation of safety system 18 has been described, it will be appreciated that many variations and modifications are possible within the scope of the invention. Many such variations and modifications are described in U.S. Provisional Patent Application Ser. No. 60/182,866, filed Feb. 16, 2000, and U.S. Provisional Patent Application Ser. No. 60/157,340, filed Oct. 1, 1999, the disclosures of which are herein incorporated by reference.

As discussed, safety system 18 includes a brake mechanism 28 that is adapted to stop the cutting tool, thereby preventing or reducing injury to the user. As also discussed previously, brake mechanism may include at least one pawl 60 adapted to engage the cutting tool to stop its rotation. Illustrative examples of suitable pawls are disclosed in copending U.S. Provisional Patent Application Ser. No. 60/225,169, filed Aug. 14, 2000, entitled "Brake Mechanism For Power Equipment," and U.S. patent application Ser. No. 09/929,241, filed Aug. 13, 2001, entitled "Brake Mechanism For Power Equipment," which are incorporated herein by reference. For purposes of the following discussion, cutting tool 14 will be described in the context of a blade 40, such as on a table saw, miter saw, circular saw or the like. It should be understood that blade 40 may include single blades, such as plywood or carbide-tipped blades, or an assembly of several blades, such as a dado blade.

Figure 3:
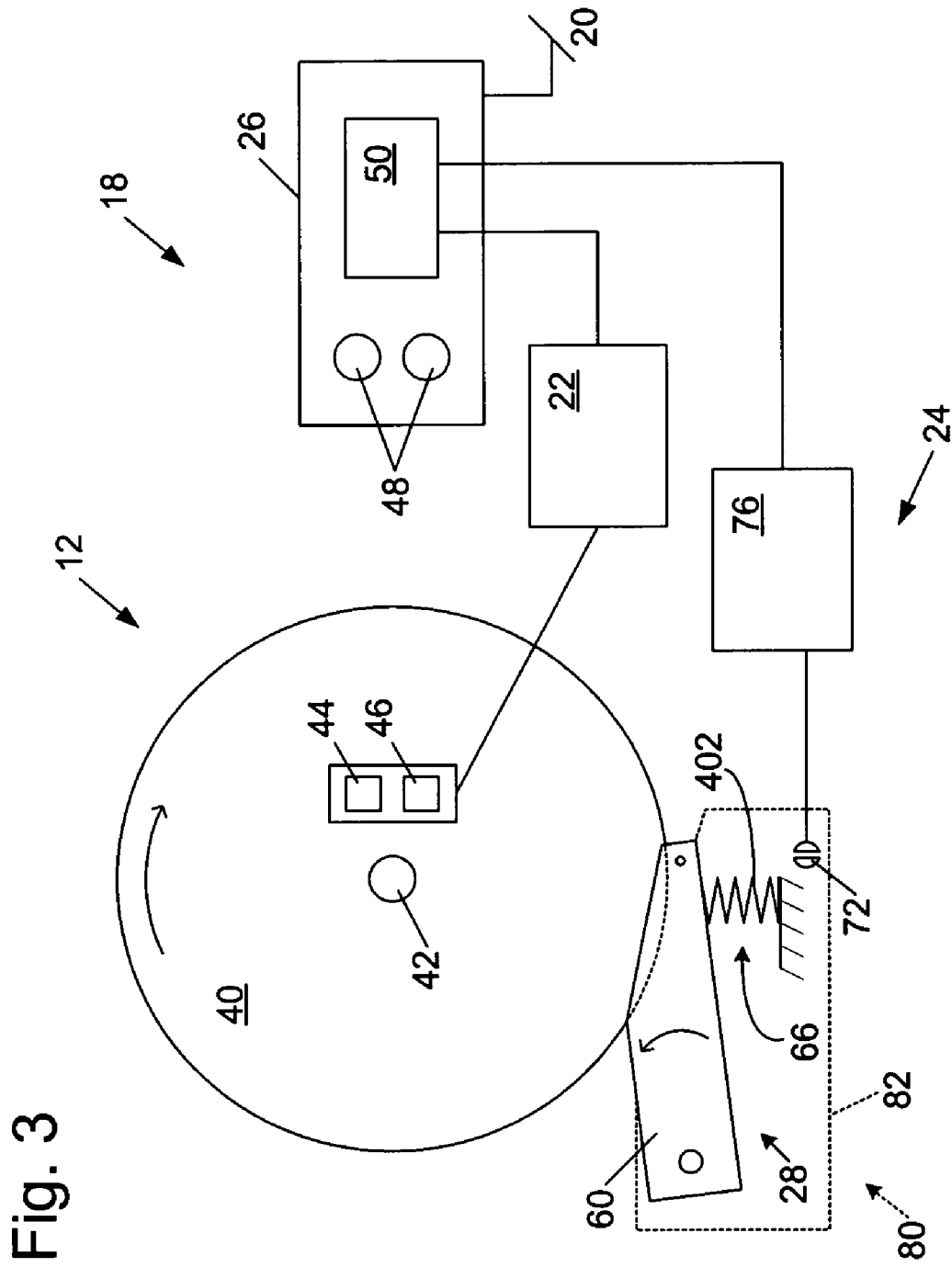
FIG. 3 is a schematic diagram of the safety system of FIG. 2 including another spring-biased brake mechanism according to the present invention.

As further discussed, pawl 60 is urged from its cocked, or restrained, position toward blade 40 or other cutting tool by biasing mechanism 30. In FIG. 2, biasing mechanism 30 includes a spring 66. From its compressed position shown in FIG. 2, spring 66 biases the pawl to move into engagement with blade 40. In FIG. 2, a restraining mechanism 32 is shown restraining pawl 60 from moving toward the blade under the biasing force exerted by spring 66. However, upon release of restraining mechanism 32, the pawl is no longer retained in its cocked position. As such, the pawl moves quickly into engagement with the blade under the force exerted by spring 66, such as shown in FIG. 3. An example of how restraining mechanism 32 may release the pawl is when a sufficiently high current is passed through fusible member 70. Other suitable release and restraining mechanisms are disclosed in copending U.S. Provisional Patent Application Ser. No. 60/225,056, filed Aug. 14, 2000, entitled "Firing Subsystem For Use In A Fast-Acting Safety System," and U.S. patent application Ser. No. 09/929,240, filed Aug. 13, 2001, entitled "Firing Subsystem For Use In A Fast-Acting Safety System," which are incorporated herein by reference.

In FIG. 2, the particular embodiment of spring 66 shown is a coiled compression spring. As used herein, spring 66 will be used to refer to any suitable spring generally, such as any of the particular types of springs discussed herein or other suitable spring mechanisms known in the art. Particular types of springs are referred to herein with particular reference numbers, such as coiled compression spring 402. In FIGS. 2-3 and the subsequent figures, various embodiments of spring-biased brake mechanisms are shown and described and include various elements, subelements and possible variations. It should be understood that spring-biased brake mechanisms according to the present invention may include any one or more of these elements, subelements and variations, regardless of whether those elements, subelements or variations are shown in the same or different figures or descriptions.

The speed at which the pawl will engage and stop the blade is dependent upon the force exerted upon pawl 60 by the spring. Therefore, the more force the spring exerts upon the pawl, the faster the pawl will travel the distance from its restrained position to the blade. In experiments, springs that exert forces in the range of 10 pounds to 500 pounds upon the pawl have proven effective, with springs that exert forces in the range of 50 and 200 pounds being preferred, and a 100-pound force proving particularly effective.

The spring selected should have sufficient force to move the brake pawl into contact with the blade or other cutting tool or portion of operative structure 12 within the desired time frame. It will be understood by those of skill in the art that the appropriate spring force may be calculated from the pawl-to-blade separation, the weight of the pawl, and the desired length of time necessary to move the pawl into contact with the blade (transit time). As discussed in U.S. Provisional Patent Application Ser. No. 60/225,200, filed Aug. 14, 2000, entitled "Contact Detection System For Power Equipment," and U.S. patent application Ser. No. 09/929,426, filed Aug. 13, 2001, entitled "Detection System For Power Equipment," which are incorporated herein by reference, it may be desirable that the brake pawl move into contact with the blade or other cutting tool within approximately one to approximately three milliseconds (ms) after being released from the restraining mechanism. Thus, for a pawl-to-blade separation of $\frac{1}{32}$-inch, the selected spring should have sufficient force to accelerate the pawl at over 500 ft/s$^2$ to achieve a transit time of approximately 3-ms, or sufficient force to accelerate the pawl at over 5,000 ft/s$^2$ to achieve a transit time of approximately 1-ms. Similarly, for a pawl-to-blade separation of $\frac{1}{8}$-inch, the spring should have sufficient force to generate a pawl acceleration of over 2,000 ft/s$^2$ for a transit time of approximately 3-ins, or a pawl acceleration of over 20,000 ft/s$^2$ for a transit time of approximately 1-ms. Likewise, for a pawl-to-blade separation of $\frac{1}{4}$-inch, the spring should have sufficient force to generate a pawl acceleration of over 4,500 ft/s$^2$ for a transit time of approximately 3-ms, or a pawl acceleration of over 40,000 ft/s$^2$ for a transit time of approximately 1-ms.

Once the acceleration has been determined (and ignoring frictional forces), the necessary spring force may be calculated from the acceleration and the weight of the pawl. For example, given a pawl-to-blade separation of $\frac{1}{32}$-inch, the 100-lb. spring mentioned above would be sufficient to move a 5-lb. brake pawl into contact with the blade in approximately 3-ms, or a 9-oz. brake pawl in approximately 1-ms. Similarly, given a pawl-to-blade separation of $\frac{1}{8}$-inch, the 100-lb. spring would be sufficient to move a 1.4-lb. brake pawl into contact with the blade in approximately 3-ms, or a 2-oz. brake pawl in approximately 1-ms. Likewise, given a pawl-to-blade separation of $\frac{1}{4}$-inch, the 100-lb. spring would be sufficient to move an 11-oz. brake pawl into contact with the blade in approximately 3-ms, or a 1-oz. brake pawl in approximately 1-ms. Similar calculations may be performed for the 10-lb., 50-lb., 200-lb., and 500-lb. springs mentioned above, as well as for any other spring force or pawl weight.

However, it should be remembered that the restraining mechanism not only must counteract the force exerted by the spring, but also must be able to quickly release the pawl from its cocked position. Therefore, there may be a tradeoff between increasing the spring force and increasing the complexity, strength and cost of the restraining mechanism to be able to restrain the increase in spring force. Also, any mechanical advantage from the placement and associated structure, if any, coupling the spring to the pawl should be taken into account.

Figure 4:
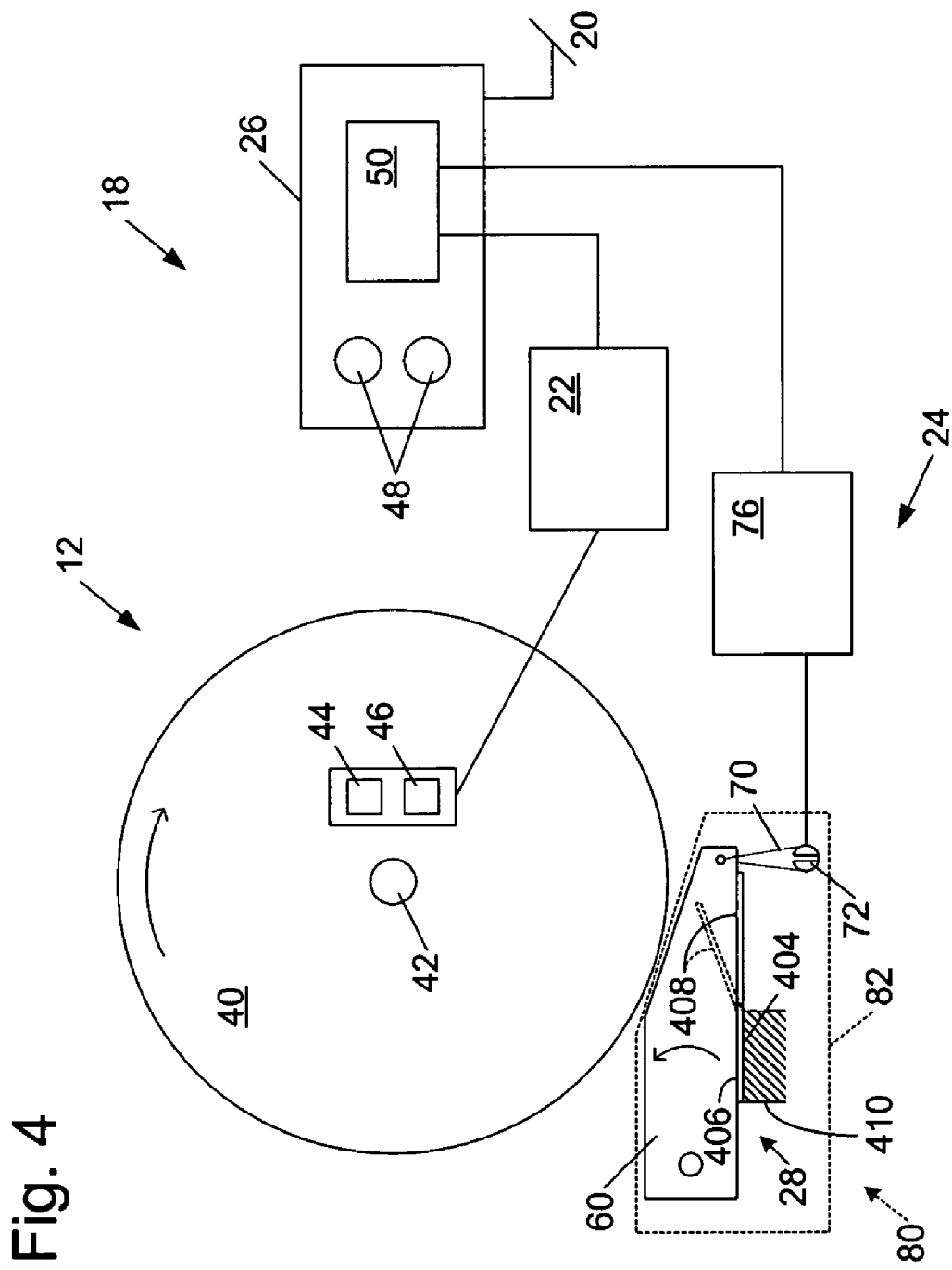
FIG. 4 is a schematic diagram of the safety system of FIG. 2 including another spring-biased brake mechanism according to the present invention.
Figure 5:
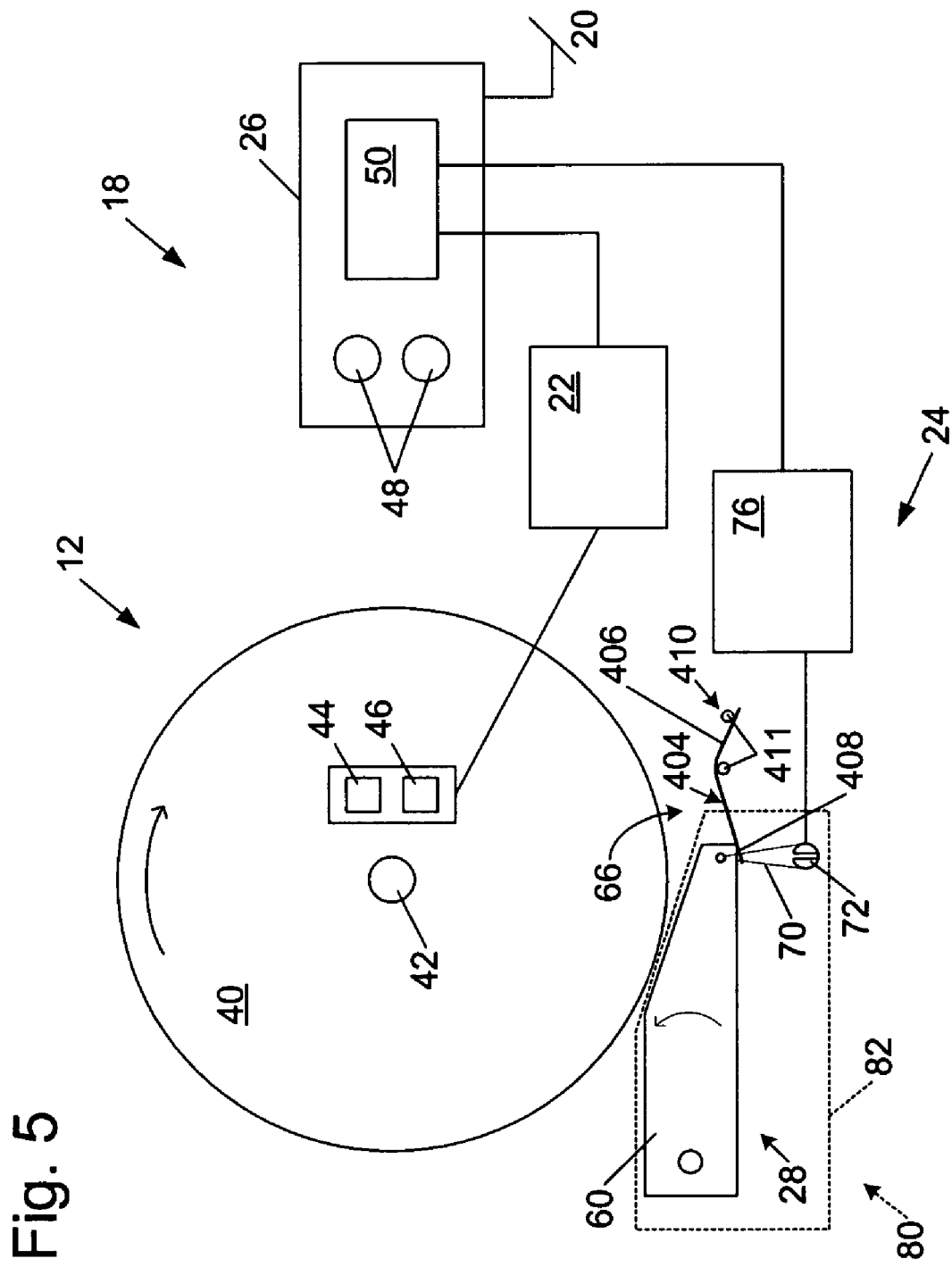
FIG. 5 is a schematic diagram of the safety system of FIG. 2 including another spring-biased brake mechanism according to the present invention.
Figure 6:
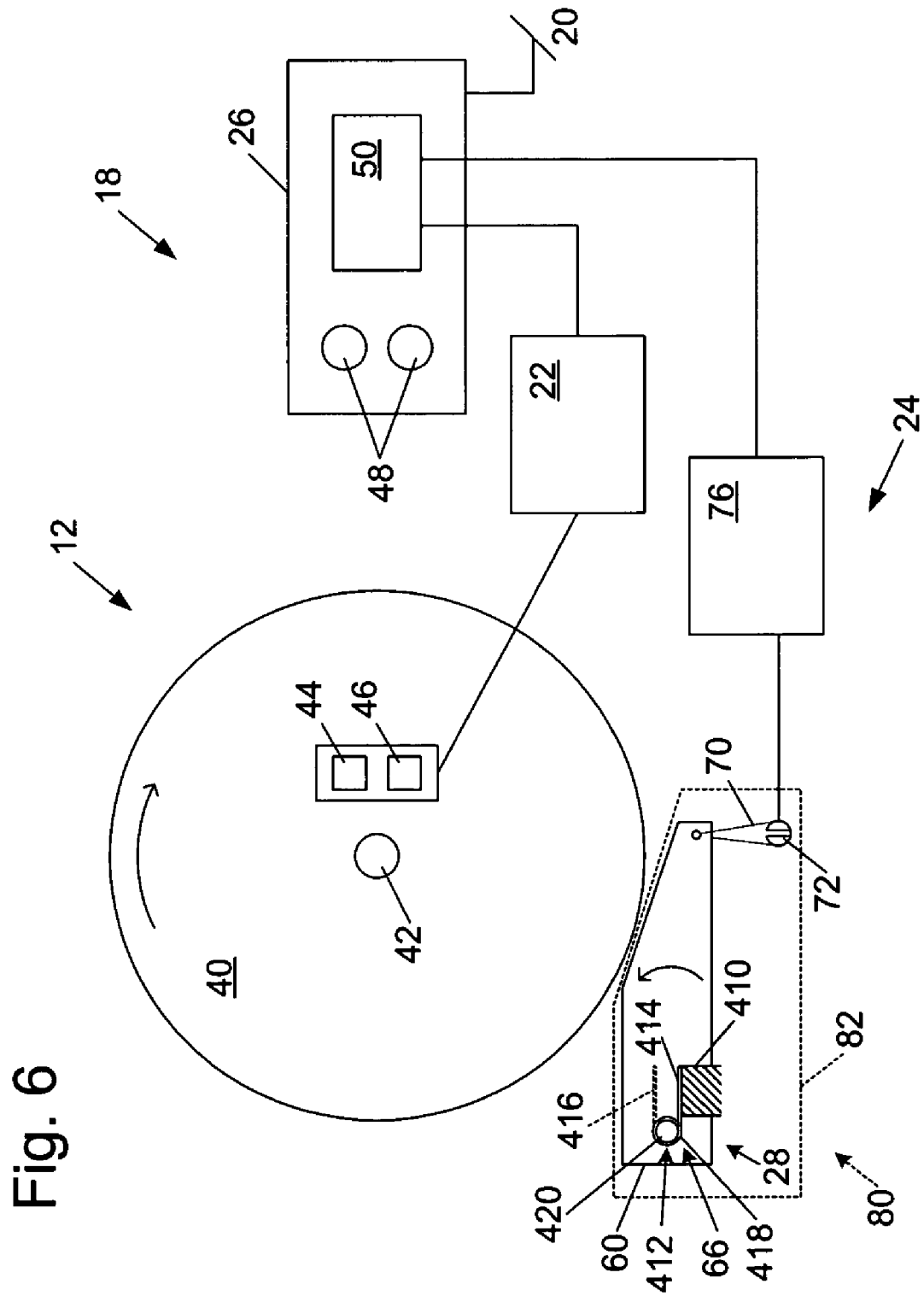
FIG. 6 is a schematic diagram of the safety system of FIG. 2 including another spring-biased brake mechanism according to the present invention.

Brake mechanisms utilizing other springs 66 are shown in FIGS. 4-6. In FIG. 4, spring 66 takes the form of a leaf spring 404, which has base portion 406 and a pawl-engaging portion 408 adapted to engage and urge pawl 60 toward blade 40. Base portion 406 is secured to a suitable mounting assembly 410. Mounting assembly 410 may be any suitable structure that supports the base portion of the leaf spring to bias the pawl-engaging portion 408 toward the pawl. As shown, leaf spring 404 is a cantilevered leaf spring. Another example of a suitable mounting assembly 410 is shown in FIG. 5, in which the mounting assembly includes a plurality of spaced-apart supports 411.

In FIG. 6, a torsion spring 412 is utilized to bias pawl 60 into engagement with blade 40. Spring 412 includes a fixed end 414, a biasing end 416 adapted to engage pawl 60, and a coiled portion 418 intermediate the ends. As shown, torsion spring 412 is mounted on the same pin or axle 420 that pawl 60 is mounted upon. It is within the scope of the invention that spring 412 may be interposed between the axle and the pawl, mounted on the axle adjacent or spaced-apart from the pawl, or mounted on structure other than axle 420.

Figure 7:
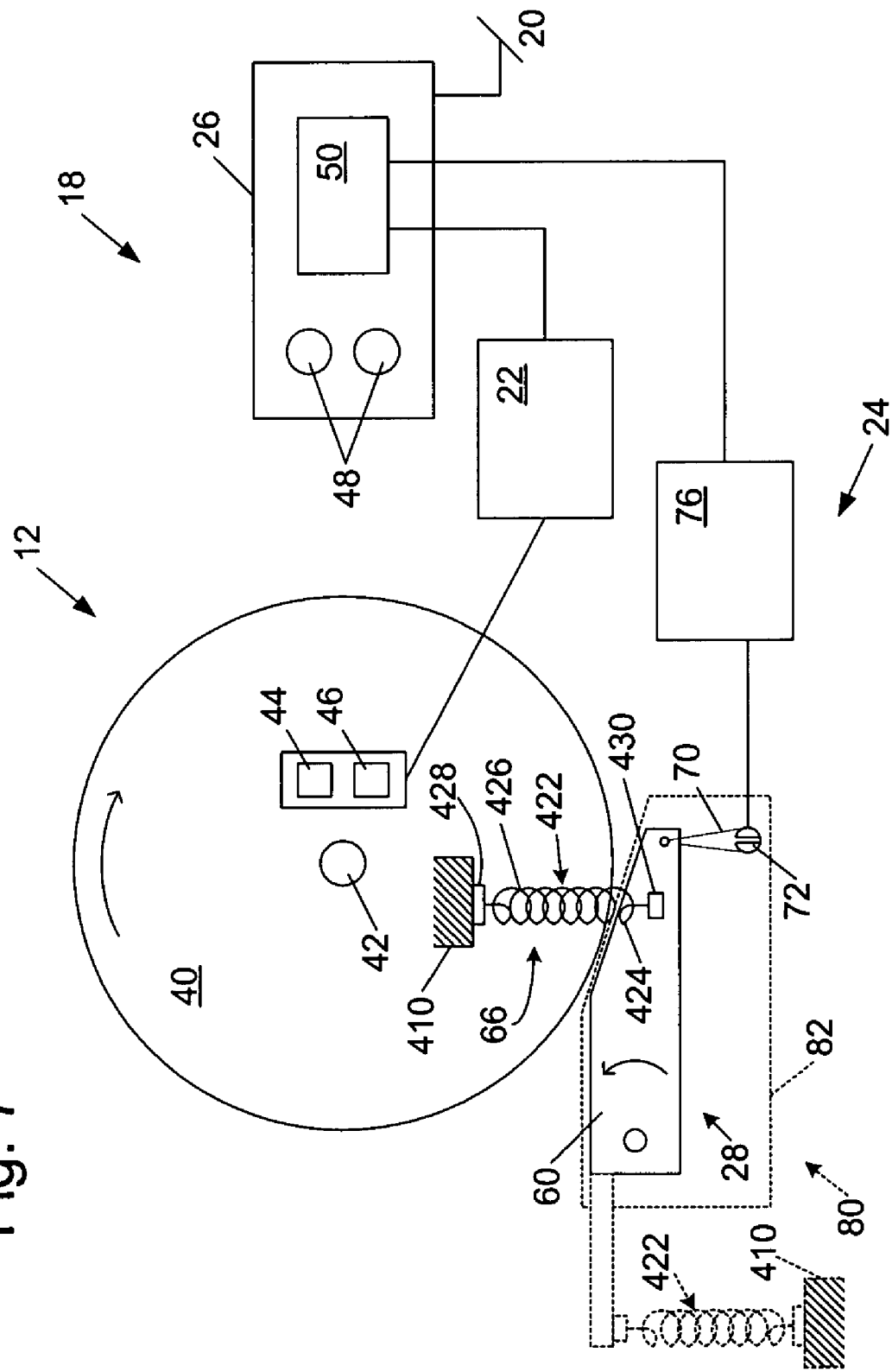
FIG. 7 is a schematic diagram of the safety system of FIG. 2 including another spring-biased brake mechanism according to the present invention.

In FIG. 7, an extension spring 422 is shown. Unlike a compression spring that resists compressive forces, extension spring 422 resists being elongated from its resting, or zero load, position. Therefore, instead of pushing or urging pawl 60 toward the blade by pushing upon the pawl, extension spring 422 pulls the pawl toward the blade or other cutting tool. As shown, extension spring 422 includes a biasing end portion 424 coupled to the pawl and a fixed end portion 426 coupled to a suitable mounting assembly 410 disposed generally toward the blade relative to the biasing end portion. The mounting assembly to which fixed end portion 426 is coupled may include a linkage, or mount, 428 that couples the end portion to the mounting assembly. Similarly, biased end portion 426 may be coupled to the pawl or other structure that moves with the pawl by a linkage or mount 430. Mounting assembly 410 may include any suitable structure able to support fixed end portion 426 without interfering with the operation of machine 10. For example, it may be mounted adjacent blade 40, coupled to the blade's arbor, mounted on structure that moves with the blade as the blade is tilted, raised or lowered, etc. Alternatively, extension spring 422 may act upon a portion of the pawl, or linkage coupled thereto, that is on the other end of the pawl's pivot axis than the blade-engaging portion of the pawl. This configuration is illustrated in dashed lines in FIG. 7. This configuration may be preferred because mounting assembly 410 is spaced further away from the blade, and may be more easily positioned.

Figure 8:
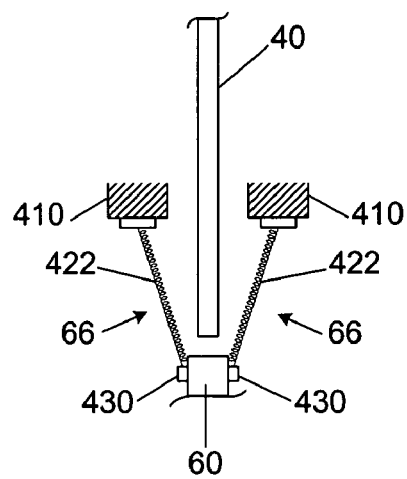
FIG. 8 is a fragmentary top plan view of another spring-biased brake mechanism according to the present invention.

Although a single spring 66 is shown in FIGS. 2-7, it should be understood that brake mechanism 28 may include more than one spring. For example, in the illustrative embodiment shown in FIG. 7, a pair of extension springs 422 may be used, such as shown in FIG. 8. When two or more springs are used, they may be of similar or different types and strengths.

In FIGS. 2-8, springs 66 are shown directly engaging pawls 60. It should be understood that the springs may alternatively engage other structure in communication with pawl 60. For example, springs 66 may engage one or more linkages through which the spring's biasing force is passed to the pawl. In such a configuration, restraining mechanism 32 may restrain any suitable portion of the biasing mechanism and pawl assembly to prevent the pawl from being moved into engagement with the blade or other cutting tool. For example, in the context of a restraining mechanism that includes a fusible member 70, the fusible member may be coupled to pawl 60, spring 66, or the one or more linkages interconnecting the spring and pawl.

Figure 9:
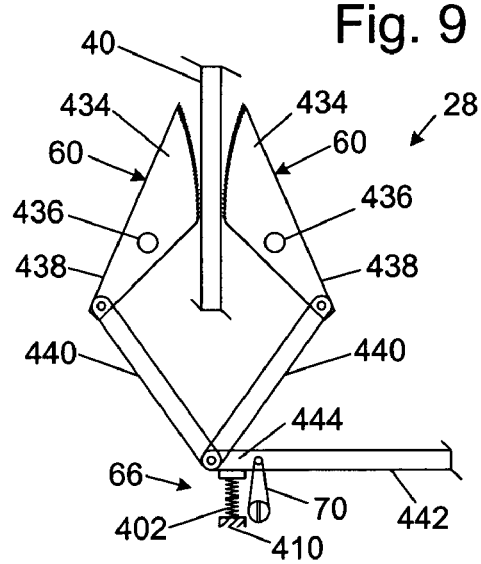
FIG. 9 is a fragmentary top plan view of another spring-biased brake mechanism according to the present invention.

An example of a brake mechanism 28 in which spring 66 directly engages a linkage instead of pawl 60 is shown in FIG. 9 in the context of a brake mechanism having a pair of pawls 60 adapted to engage a blade 40. As shown, pawls 60 include blade-engaging portions 434 adapted to engage blade 40. Pawls 60 are pivotal about axles or pins 436 and include distal portions 438 to which linkages 440 are coupled. Linkages 440 are further coupled to a spring-engaging linkage 442, which as shown, includes an end 444 adapted to be moved toward blade 40, thereby drawing the blade-engaging portions of the pawls into contact with the blade. In FIG. 9, a compression spring 402 is shown engaging linkage 442, however, any of the springs described herein could be used.

Springs 66 may also exert a biasing force upon an engagement mechanism instead of pawl 60. In such an embodiment, the force of the spring is not applied to the pawl unless restraining mechanism 32 releases the engagement mechanism or biasing mechanism to urge the pawl into engagement with the blade or cutting tool of machine 10. An advantage of such a brake mechanism is that the biasing mechanism is not exerting force upon the pawl until the pawl is urged into contact with blade 40. This may, but does not necessarily, enable pawl 60 to be selectively removed and replaced from the brake mechanism without disabling biasing mechanism 30.

Additionally, or alternatively, biasing mechanism 30 may be self-contained as a module or cartridge that can be selectively removed and replaced from the rest of the brake mechanism when the fusible member or other portion of restraining mechanism 32 that counteracts the force of spring 66 is secured between portions of this module.

Figure 10:
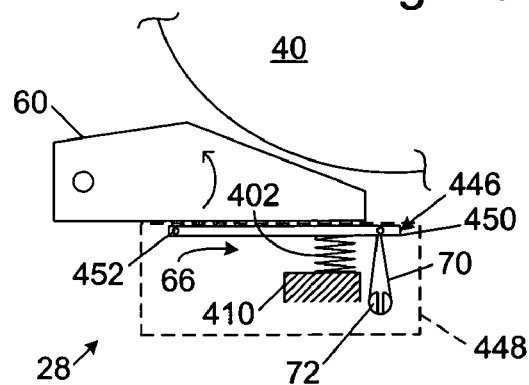
FIG. 10 is a fragmentary side elevation view of another spring-biased brake mechanism according to the present invention.

An example of a brake mechanism with an engagement mechanism is shown in FIG. 10. As shown, spring 66 acts upon engagement mechanism 446, which is depicted to include a pivotal plate 450. Plate 450 selectively prevents the spring's biasing force from being exerted upon pawl 60. As shown, a restraining mechanism, such as fusible member 70, prevents plate 450 from pivoting about its axle 452 under the biasing force of spring 66. As a result, the pawl is not urged toward the blade. A module or cartridge 448 is shown schematically in dashed lines, and is a possible rather than necessary element of brake mechanism 28. Module 448 typically will be mounted upon a suitable support or receiver in the machine, and may also include a connection with a suitable mechanism for releasing restraining mechanism 32. For example, contact mount 72 may be electrically connected to a portion of the release mechanism that does not form part of the replaceable module.

Figure 11:
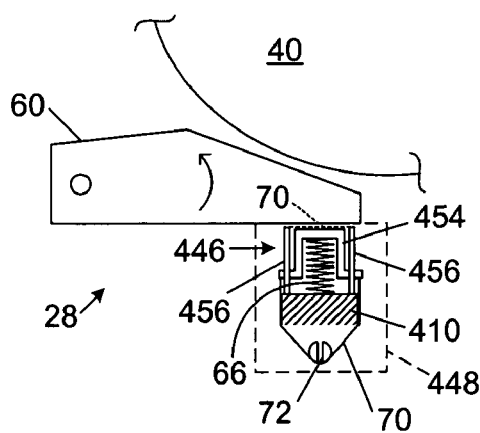
FIG. 11 is a fragmentary side elevation view of another spring-biased brake mechanism according to the present invention.
Figure 12:
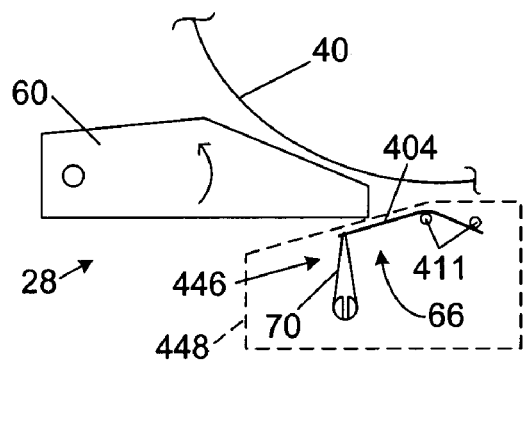
FIG. 12 is a fragmentary side elevation view of another spring-biased brake mechanism according to the present invention.

A variation of this brake mechanism is shown in FIG. 11, in which engagement mechanism 446 takes the form of a slidable member 454 that is adapted to translate, or slide, along tracks 456 toward and away from blade 40. As shown, fusible member 70 restrains the slidable member 454 from moving toward the blade, thereby preventing the spring from urging pawl 60 into contact with blade 40. Also shown in FIG. 11, is a variation of this brake mechanism, in which fusible member 70 extends across the travel path of slidable member 454 to prevent member 454 from moving under the force exerted by spring 66. In fact, fusible member 70 may itself form engagement mechanism 446, such as shown in FIG. 12, where the fusible member extends across the path of spring 66, thereby preventing the spring from urging pawl 60 into the blade or other cutting tool.

The brake mechanisms shown in FIGS. 9-11 may also be understood as including biasing mechanisms 30 with compound release mechanisms because there is more than one step for the brake mechanism to be actuated and pawl 60 to engage the blade or other cutting tool. Unlike the brake mechanisms shown in FIGS. 3-8, in which the release of restraining mechanism 32 was all that was required for spring 66 to urge pawl 60 into the blade or other cutting tool, the brake mechanisms shown in FIGS. 9-11 utilize a compound release to engage blade 40 with pawl 60. For example, the release of restraining mechanism 32 may free a portion of biasing mechanism 30 to move, such as to engage engagement mechanism 446 or a linkage, which in turn transfers this force to pawl 60.

Figure 13:
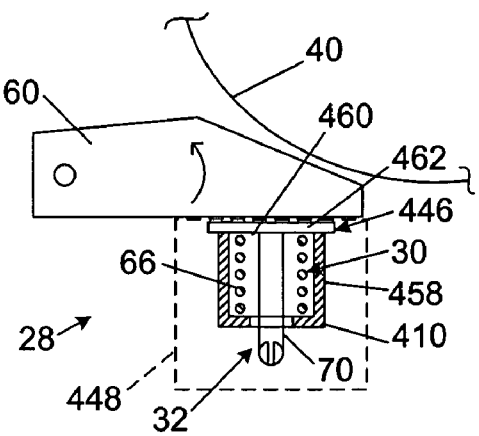
FIG. 13 is a fragmentary side elevation view of another spring-biased brake mechanism according to the present invention.

In FIG. 13, another example of a brake mechanism 28 with a compound release, or compound release mechanism, is shown in the form of a self-contained actuator assembly. As shown, spring 66 is housed in a shell 458 with an open end 460 through which the spring, or a suitable linkage coupled to the spring, may extend upon release of restraining mechanism 32. In the illustrative embodiment shown in FIG. 13, end 460 is at least partially covered by a spanning member 462 positioned between the spring and pawl 60. Member 462 does not need to completely close end 460, however, it should prevent spring 60 from passing through end 460 and engaging pawl 60. Fusible member 70, or another suitable embodiment of restraining mechanism 32, is coupled to member 462 and prevents spring 66 from urging the spanning member into contact with pawl 60. As shown, member 70 passes through shell 458, and in the illustrated embodiment, spring 66. It should be understood that shell 458 may be used with embodiments of brake mechanism 28 that do not include a compound release, in which case pawl 60 would typically abut the open end of the shell.

Figure 14:
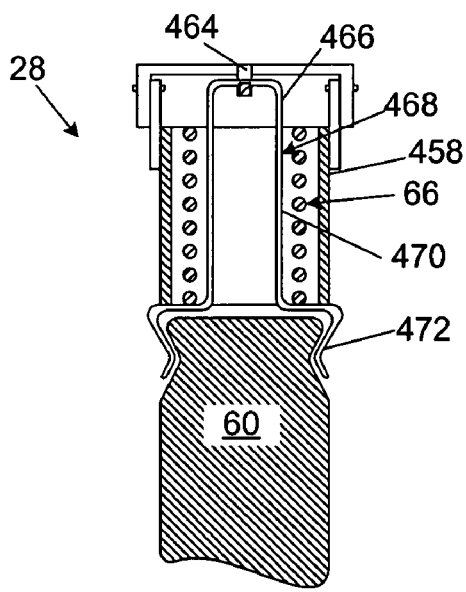
FIG. 14 is a cross-sectional side elevation view of another spring-biased brake mechanism according to the present invention.
Figure 15:
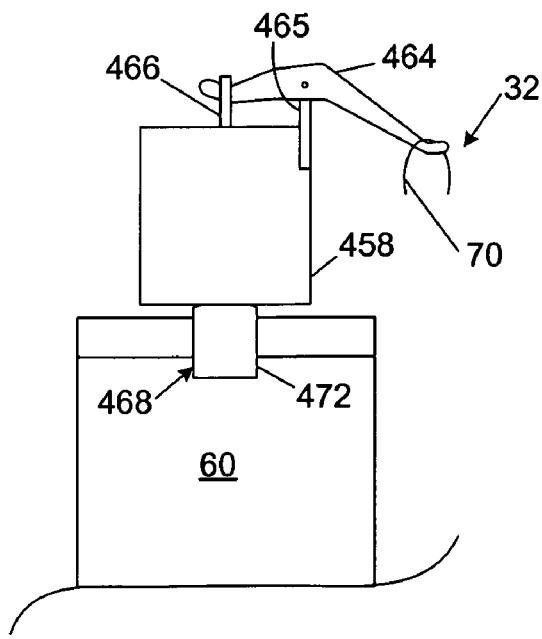
FIG. 15 is an end elevation view of the brake mechanism of FIG. 14.

Other exemplary embodiments of self-contained actuator assemblies are shown in FIGS. 14 and 15, where restraining mechanism 32 is releasably coupled to a lever arm 464 that in turn is coupled to an end portion 466 of a carrier 468. Lever, or pivot, arm 464 pivots about a pivot axis defined by a projecting portion 465 on shell 458. It should be remembered that arm 464, carrier 468 and shell 458 (including portion 465) must be sufficiently strong to withstand the force of spring 66. End portion 466 of carrier 468 should be mounted on arm 464 so that it will release relatively immediately upon release of restraining mechanism 32 and initial pivoting of arm 464 about portion 465. Alternatively, arm 464 should be able to pivot without obstruction until pawl 60 is fully engaged with blade 40 so that the pivot arm does not impede the motion of pawl 60, and thereby increase the time required to stop blade 40. In such a configuration where arm 464 pivots without restricting the motion of the pawl, arm 464 does not need to release from carrier 468, and instead these portions may remain coupled together.

Carrier 468 includes an elongate support 470 that extends through shell 458 and further includes a pawl-receiving portion 472 that is adapted to releasably receive pawl 60, thereby allowing the pawl to be selectively removed and replaced without dismantling or otherwise disassembling the rest of brake mechanism 28. As shown, pawl-receiving portion 472 also forms a spanning member in that it prevents the spring from urging the pawl into engagement with blade 40. In FIGS. 14 and 15, portion 472 and pawl 60 are shown having complimentary configurations so that the pawl may be coupled to the pawl-receiving portion without requiring additional securing mechanisms. In the embodiment shown, the pawl may be either slid onto portion 472 from an end, or alternatively by briefly deflecting portion 472 outwardly as the pawl is inserted into its mounted position. It will be appreciated, however, that additional securing mechanisms may be used, such as screws, pins, and other releasable fasteners. Because neither spring 66 nor fusible member 70 act directly upon the pawl or pawl-receiving portion, the coupling between these portions does not have to be strong. As a further variation, pawl 60 may be fixedly secured to, or even integrally formed with, carrier 468, or at least the pawl-engaging portion thereof.

Figure 16:
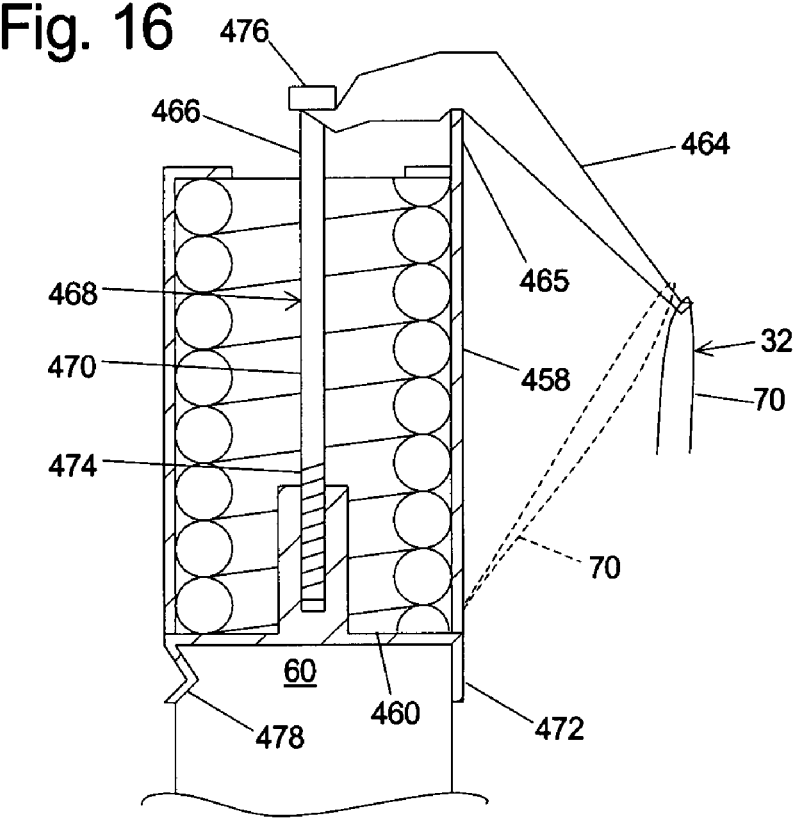
FIG. 16 is a cross-sectional side elevation view of another spring-biased brake mechanism according to the present invention.

A variation of a self-contained actuator is shown in FIG. 16, in which the length of carrier 468 is selectively adjustable, thereby allowing the relative positioning of the pawl relative to blade 40 to also be adjustable. As shown, support 470 includes a threaded portion 474 that is threadingly received into pawl-receiving portion 472. The length of carrier 468 may be adjusted by rotating support 470, such as via a user-manipulable portion 476, to increase or decrease the extent to which portion 474 is received into pawl-receiving portion 472. In FIG. 16, pawl-receiving portion 472 is also shown including key structure 478 that prevents pawl 60 from being installed into the pawl-receiving portion other than in a position defined by key structure 478.

Figure 17:
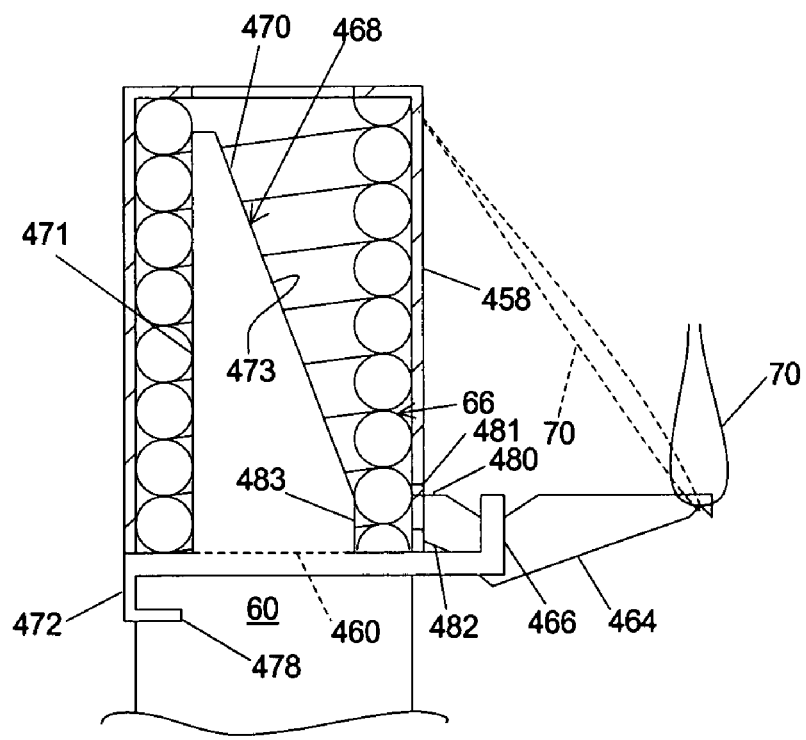
FIG. 17 is a cross-sectional side elevation view of another spring-biased brake mechanism according to the present invention.

Another embodiment of a spring-biased brake mechanism is shown in FIG. 17. As shown, lever arm 464 includes an end portion 480 that couples to shell 458 proximate open end 460. In the embodiment shown, end portion 480 is received into a notch 481 in the shell, and includes a shoulder 482 about which the arm pivots upon release of restraining mechanism 32. Alternatively, shell 458 may include a ledge or projection upon which arm 464 is seated. Preferably, at least an end region 483 of elongate support 470 generally conforms to the inner diameter of spring 66 to resist shifting or tilting of the carrier when in the restrained position shown in FIG. 17.

As shown, support 470 includes an edge 471 that extends generally parallel and against spring 66, with a generally opposed edge 473 tapering from pawl-receiving portion 472 toward end portion 466. Also shown in FIG. 17 is another example of a pawl-receiving portion 472 with a key structure 478. Edge 471 is on the side of support 470 distal pivot arm 464 to stabilize the carrier during installation and while in the restrained position. Edge 473 is on the side of support 470 proximate lever arm 464 to allow the support to tilt as it is urged from shell 458 upon release of restraining mechanism 32. This configuration of carrier 468 is an example of a carrier that may be integrally formed, or monolithic, with pawl 60.

In the brake mechanisms shown in FIGS. 14-17, the portion of fusible member 70 not coupled to pivot arm 464 may be secured to any suitable supporting structure to allow the fusible member to counteract the force of spring 66. This supporting structure may form part of the brake mechanism shown in FIGS. 14-17, such as securing the fusible member to shell 458 or pawl-receiving portion 472. In such a configuration, the portions of the brake, biasing and restraining mechanisms shown in FIGS. 14-17 form a self-contained module or self-contained actuator.

Figure 18:
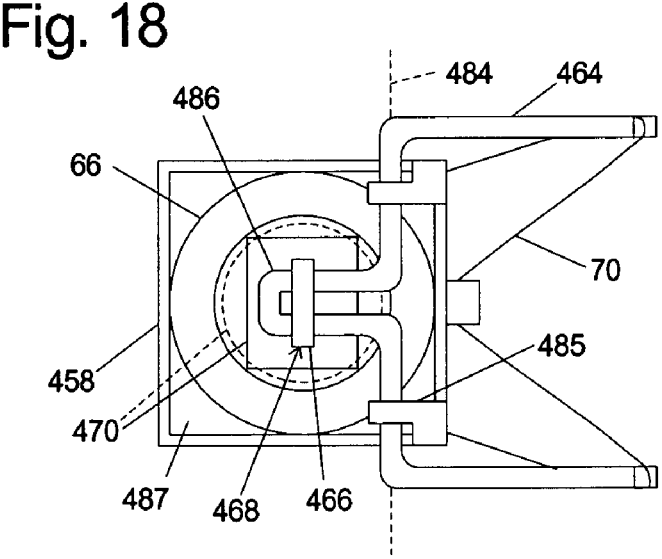
FIG. 18 is a top plan view of another spring-biased brake mechanism according to the present invention.

In FIG. 18, an embodiment of a shell and pivot arm assembly is shown in which the distance between the pivot axis 484 of arm 464 and the region upon which arm 464 supports carrier 468 is reduced from the embodiments shown in FIGS. 14-16. As shown, arm 464 is pivotally coupled to shell 458 by a pair of mounts 485 and includes a carrier-receiving portion 486. In the embodiment shown in FIG. 18, arm 464 may have a generally planar configuration that allows the arm to extend against a portion of the shell's end 487. Upon release of the restraining mechanism, arm 464 pivots relative to shell 458 and portion 486 pivots into the shell and releases the carrier to move under the force of spring 66. As shown, end 487 of shell 484 is sufficiently open to permit portion 486 to pivot into the shell and release carrier 468. As shown, end 487 is also sufficiently obstructed to prevent spring 66 from passing therethrough. Also illustrated in FIG. 18 is an embodiment of support 470 that generally conforms to the inner dimension of spring 66, thereby supporting carrier 468 against axial tilting within the shell as the carrier passes through the shell. Another suitable configuration for support 470 is shown in dashed lines in FIG. 18.

Figure 20:
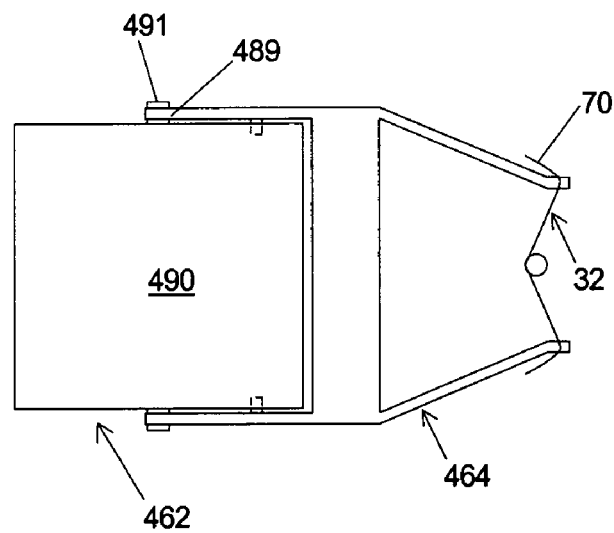
FIG. 20 is a bottom plan view of the brake mechanism of FIG. 19.
Figure 19:
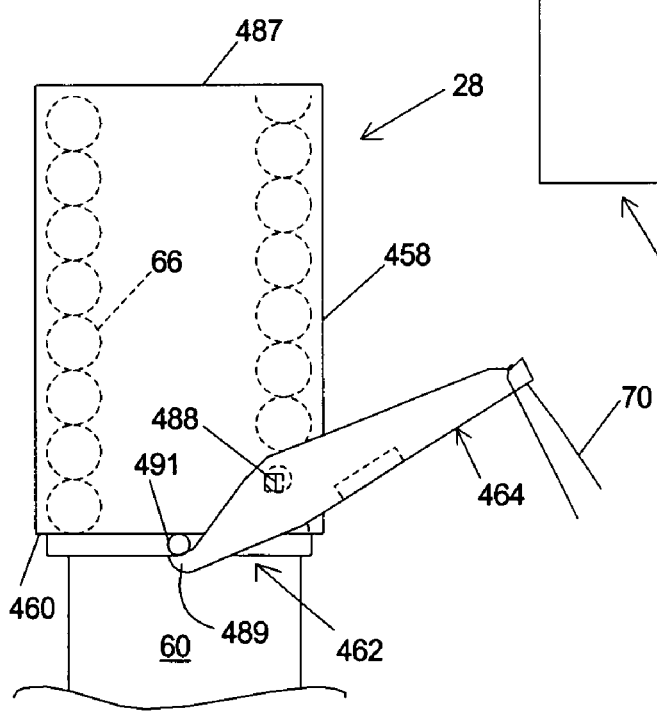
FIG. 19 is a side elevation view of another spring-biased brake mechanism according to the present invention.

In FIGS. 19 and 20, another example of a spring-biased brake mechanism with a lever arm 464 that releases from open end 460 of shell 458 is shown. As shown, arm 464 is pivotally coupled to shell 458 by pins 488 and includes a pair of catches 489 that engage a spanning member 462. As shown, spanning member 462 includes a cover 490 that covers open end 460 of shell 458 and includes projections 491 that are engaged by catches 489. Alternatively, spanning member 462 may include any other suitable configuration sufficient to prevent spring 66 from passing through, or urging another member through, end 460 prior to release of restraining mechanism 32. Preferably, catches 489 are shaped to release spanning member 462 as arm 464 begins to pivot upon release of restraining mechanism 32.

Figure 21:
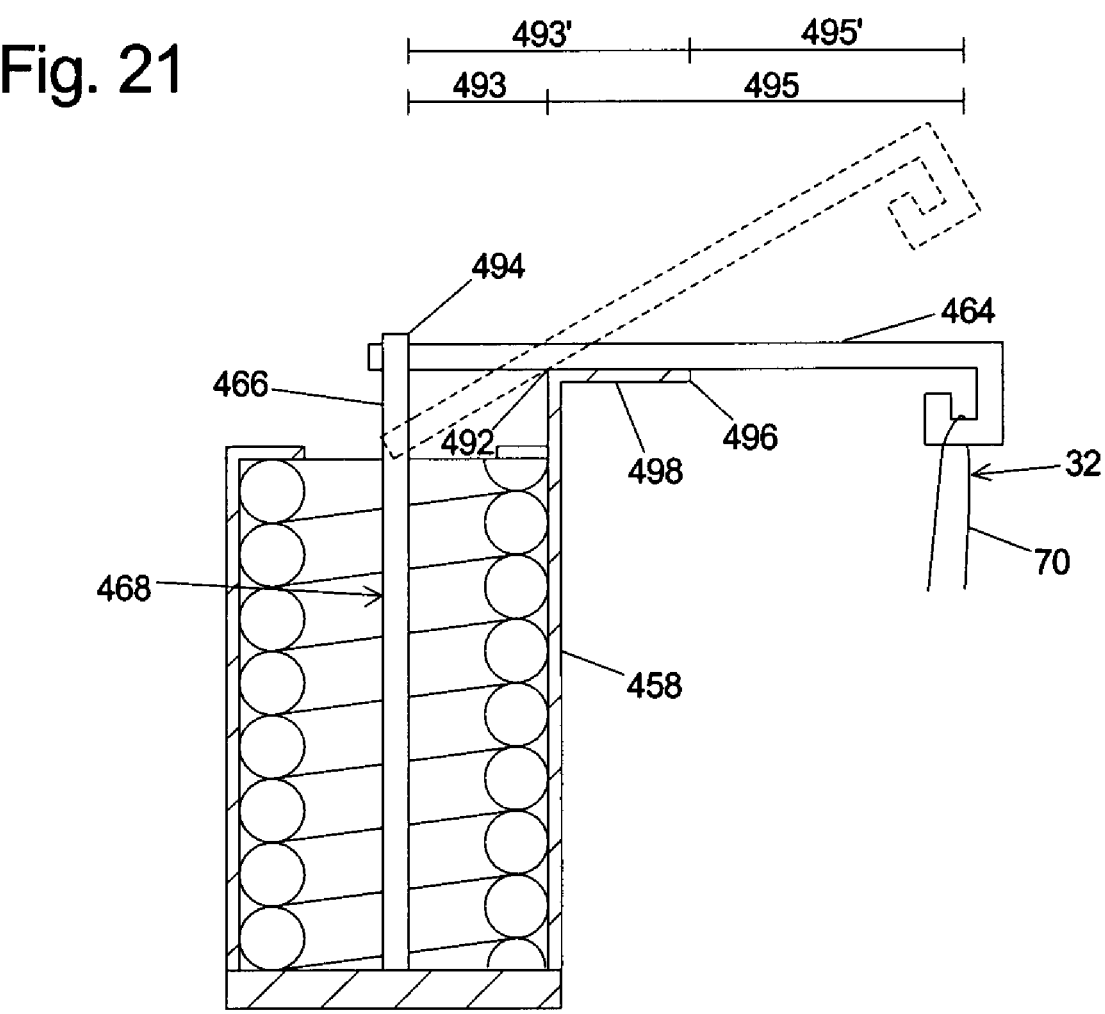
FIG. 21 is a side elevation view of another spring-biased brake mechanism according to the present invention.

In FIG. 21, another example of a spring-biased brake mechanism is shown. As shown, lever arm 464 and shell 458 are adapted to facilitate more uniform positioning of carrier 468, and thereby pawl 60, as arm 464 is secured in a cocked, or restrained, position by restraining mechanism 32, such as fusible member 70. Prior to attachment of fusible member 70, lever arm 464 is pivoted about edge 492 of shell 458 as the arm is pivoted to the position shown in solid lines in FIG. 21. In this interval, there is a mechanical advantage achieved because the distance 493 between edge 492 and the proximate edge 494 of carrier 468 is much less than the distance 495 between edge 492 and fusible member 70. However, to continue pivoting arm 464 downward, this mechanical advantage is lost because the fulcrum about which the arm is pivoted changes, as reflected by distances 493' and 495'. As shown, arm 464 now pivots about the edge 496 of extension 498. The corresponding amount of force required to pivot arm 464 may be used as an indicator of when arm 464 is positioned properly, at which point fusible member 70 may be attached. Of course, if fusible member 70 is a preformed member of fixed length, then precise positioning of the lever arm 464 and pawl 60 are achieved simply by the attachment of the fusible member.

It will be appreciated that the spring-biased brake mechanism described above may be implemented with many variations within the scope of the invention. For example, the spring-biased mechanisms disclosed herein may be used to drive the retraction of blade 40, such as on a table saw or a miter saw, such as described in copending U.S. Provisional Patent Application Ser. No. 60/225,089, filed Aug. 14, 2000, entitled "Retraction System For Use In Power Equipment," U.S. patent application Ser. No. 09/929,242, filed Aug. 13, 2001, entitled "Retraction System For Use In Power Equipment," U.S. Provisional Patent Application Ser. No. 60/225,057, filed Aug. 14, 2000, entitled "Miter Saw With Improved Safety System," and U.S. patent application Ser. No. 09/929,238, filed Aug. 13, 2001, entitled "Miter Saw With Improved Safety System," which are incorporated herein by reference.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. No single feature, function, element or property of the disclosed embodiments is essential to all of the disclosed inventions. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

The invention claimed is:

1. A woodworking machine comprising:
   a support frame;
   a motor supported by the frame;
   a cutting tool supported by the frame and moveable by the motor;
   a detection system adapted to detect a dangerous condition between a person and the cutting tool;
   a brake component adapted to engage the cutting tool, where the brake component has a ready position spaced apart from the cutting tool; and
   an actuator having stored energy sufficient to move the brake component from the ready position into engagement with the cutting tool within approximately 3 milliseconds or less after the dangerous condition is detected.

2. The machine of claim 1, where the actuator includes a spring adapted to move the brake component into engagement with the cutting tool within approximately 3 milliseconds or less.

3. The machine of claim 2, further comprising a housing removably coupled to the frame, where the spring and the brake component are mounted within the housing.

4. The machine of claim 1, where the spacing between the brake component and the cutting tool is at least ⅛-inch when the brake component is in the ready position.

5. The machine of claim 1, where the spacing between the brake component and the cutting tool is at least ¼-inch when the brake component is in the ready position.

6. The machine of claim 1, where the actuator is adapted to move the brake at an acceleration of over 500 ft/s2 when the detection system detects the dangerous condition.

7. The machine of claim 1, where the actuator is adapted to move the brake at an acceleration of over 2000 ft/s2 when the detection system detects the dangerous condition.

8. The machine of claim 6, where the actuator includes one or more springs adapted to move the brake into contact with the blade.

9. The machine of claim 8, where the one or more springs are adapted to apply at least 50 lbs. of force to move the brake into contact with the blade.

10. The machine of claim 1, wherein the cutting tool includes a circular blade having an outer perimeter, and further wherein the brake component is adapted to engage the outer perimeter of the circular blade.

11. The machine of claim 10, wherein the machine is a table saw.

12. The machine of claim 10, wherein the brake component is adapted to be pivoted into engagement with the outer perimeter of the circular blade.

13. The machine of claim 10, wherein the brake component is adapted to be slid into engagement with the outer perimeter of the circular blade.

14. The machine of claim 10, wherein the brake component is adapted to be rotated into engagement with the outer perimeter of the circular blade.

15. The machine of claim 10, wherein at least a portion of the brake component is destroyed when the brake component engages the circular blade.

16. The machine of claim 1, wherein the brake component is adapted to be pivoted into engagement with the cutting tool.

17. The machine of claim 1, wherein the brake component is adapted to be slid into engagement with the cutting tool.

18. The machine of claim 1, wherein the brake component is adapted to be rotated into engagement with the cutting tool.

19. The machine of claim 1, wherein at least a portion of the brake component is destroyed when the brake component engages the cutting tool.

20. A woodworking machine, comprising:

a cutting tool adapted to cut workpieces;

means for driving the cutting tool;

means for detecting a dangerous condition between a person and the cutting tool;

a brake component spaced apart from the cutting tool; and means for moving the brake component into contact with the cutting tool within 3 milliseconds or less after the dangerous condition is detected.

21. A woodworking machine comprising:

a support frame;

a motor supported by the frame;

a cutting tool supported by the frame and moveable by the motor;

a detection system adapted to detect a dangerous condition between a person and the cutting tool;

a mechanism having a moveable component adapted to move upon detection of the dangerous condition by the detection system, where movement of the moveable component contributes to the mitigation or prevention of injury to the person, and an actuator having stored energy sufficient to start moving the moveable component within 3 milliseconds after the dangerous condition is detected.

\* \* \* \* \*